US012666259B2

(12) United States Patent
Lehtovirta et al.

(10) Patent No.: US 12,666,259 B2
(45) Date of Patent: Jun. 23, 2026

(54) AUTHENTICATION OF A COMMUNICATIONS DEVICE

(71) Applicant: Telefonaktiebolaget LM Ericsson (publ), Stockholm (SE)

(72) Inventors: Vesa Lehtovirta, Espoo (FI); Vesa Torvinen, Sauvo (FI); Noamen Ben Henda, Vällingby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 799 days.

(21) Appl. No.: 17/293,093

(22) PCT Filed: Nov. 1, 2019

(86) PCT No.: PCT/EP2019/079953
§ 371 (c)(1),
(2) Date: May 12, 2021

(87) PCT Pub. No.: WO2020/099148
PCT Pub. Date: May 22, 2020

(65) Prior Publication Data
US 2021/0400475 A1      Dec. 23, 2021

(30) Foreign Application Priority Data

Nov. 12, 2018    (SE) .................................... 1830329-7

(51) Int. Cl.
*H04W 12/0433*       (2021.01)
*H04W 12/06*        (2021.01)
(52) U.S. Cl.
CPC ....... *H04W 12/0433* (2021.01); *H04W 12/06* (2013.01)

(58) Field of Classification Search
CPC .......................... H04W 12/06; H04W 12/0433
See application file for complete search history.

(56) References Cited

U.S. PATENT DOCUMENTS 8,881,236 B2 * 11/2014 Wang ...................... H04L 61/10
726/3
10,237,787 B2 * 3/2019 Sharma ............... H04W 12/033
(Continued)

FOREIGN PATENT DOCUMENTS

EP        2988538 A1      2/2016

OTHER PUBLICATIONS

R. Arul, G. Raja, A. K. Bashir, J. Chaudry and A. Ali, "A Console GRID Leveraged Authentication and Key Agreement Mechanism for LTE/SAE," in IEEE Transactions on Industrial Informatics, vol. 14, No. 6, pp. 2677-2689, Jun. 2018. (Year: 2018).*

(Continued)

*Primary Examiner* — Kari L Schmidt
(74) *Attorney, Agent, or Firm* — Murphy, Bilak & Homiller, PLLC

(57) ABSTRACT

A method is performed by a communications device. The method may comprise receiving, via a control plane of a serving network of the communications device, a message in an authentication procedure for authentication of the communications device with a home network of the communications device. The message in some embodiments indicates that the authentication is for the purpose of establishing a shared security key between the communications device and an application server.

21 Claims, 19 Drawing Sheets

(56) References Cited

U.S. PATENT DOCUMENTS

| | | | | |
|---|---|---|---|---|
| 10,873,464 | B2 * | 12/2020 | Muhanna | H04L 9/0822 |
| 2002/0114469 | A1 * | 8/2002 | Faccin | H04W 12/0433 |
| | | | | 380/270 |
| 2004/0165726 | A1 * | 8/2004 | Yamamichi | H04L 9/0869 |
| | | | | 380/277 |
| 2006/0154645 | A1 * | 7/2006 | Valkenburg | H04L 63/0853 |
| | | | | 455/411 |
| 2006/0171541 | A1 | 8/2006 | Horn et al. | |
| 2007/0204160 | A1 * | 8/2007 | Chan | H04L 9/0838 |
| | | | | 713/171 |
| 2007/0294186 | A1 * | 12/2007 | Yan | G06Q 20/3829 |
| | | | | 705/71 |
| 2008/0102795 | A1 * | 5/2008 | Johur | H04L 63/06 |
| | | | | 455/411 |
| 2009/0054036 | A1 * | 2/2009 | Chen | H04L 9/0833 |
| | | | | 455/411 |
| 2010/0002883 | A1 * | 1/2010 | Sammour | H04W 12/0431 |
| | | | | 380/272 |
| 2011/0004762 | A1 * | 1/2011 | Horn | H04W 12/04 |
| | | | | 713/171 |
| 2011/0167270 | A1 * | 7/2011 | Lee | H04L 9/3242 |
| | | | | 708/250 |
| 2012/0030739 | A1 * | 2/2012 | Vadapalli | H04W 12/069 |
| | | | | 726/6 |
| 2012/0106456 | A1 * | 5/2012 | Jin | H04W 68/02 |
| | | | | 370/328 |
| 2012/0110637 | A1 * | 5/2012 | Holtmanns | H04W 12/084 |
| | | | | 726/1 |
| 2012/0204224 | A1 * | 8/2012 | Wang | H04L 67/63 |
| | | | | 726/3 |
| 2012/0204231 | A1 | 8/2012 | Holtmanns et al. | |
| 2016/0094988 | A1 * | 3/2016 | Lee | H04L 9/0825 |
| | | | | 380/270 |
| 2017/0012956 | A1 * | 1/2017 | Lee | H04L 63/0428 |
| 2017/0064554 | A1 * | 3/2017 | Li | H04L 9/088 |
| 2018/0007557 | A1 * | 1/2018 | Lee | H04L 67/12 |
| 2018/0013568 | A1 * | 1/2018 | Muhanna | H04L 9/0822 |
| 2018/0295125 | A1 * | 10/2018 | Lee | H04W 76/27 |
| 2018/0317086 | A1 * | 11/2018 | Ben Henda | H04W 12/062 |
| 2022/0394567 | A1 * | 12/2022 | Sharma | H04W 12/033 |

OTHER PUBLICATIONS

Zhiguo Wan, et al. 2008. A secure privacy-preserving roaming protocol based on hierarchical identity-based encryption for mobile networks. In Proceedings of the first ACM conference on Wireless network security (WiSec '08). Association for Computing Machinery, New York, NY, USA, 62-67 (Year: 2008).*

3GPP, "3GPP TR 33.cde V0.2.0", 3rd Generation Partnership Project; Technical Specification Group Services and System Aspects; Study on authentication and key management for applications; based on 3GPP credential in 5G (Release 16), Sep. 2018, 1-16.

3GPP, "3GPP TS 24.302 V15.4.0", 3rd Generation Partnership Project; Technical Specification Group Core Network and Termi-nals; Access to the 3GPP Evolved Packet Core (EPC) via non-3GPP access networks; Stage 3 (Release 15), Sep. 2018, 1-176.

3GPP, "3GPP TS 33.102 V15.0.0", 3rd Generation Partnership Project; Technical Specification Group Services and System Aspects; 3G Security; Security architecture (Release 15), Jun. 2018, 1-77.

3GPP, "3GPP TS 33.310 V16.0.0", 3rd Generation Partnership Project; Technical Specification Group Services and System Aspects; Network Domain Security (NDS); Authentication Framework (AF) (Release 16), Jun. 2018, 1-58.

3GPP, "3GPP TS 33.402 V15.1.0", 3rd Generation Partnership Project; Technical Specification Group Services and System Aspects; 3GPP System Architecture Evolution (SAE); Security aspects of non-3GPP accesses (Release 15), Jun. 2018, 1-72.

3GPP, "3rd Generation Partnership Project; Technical Specification Group Services and System Aspects; Generic Authentication Archi-tecture (GAA); Generic Bootstrapping Architecture (GBA) (Release 15)", 3GPP TS 33.220 V15.3.0, Sep. 2018, 1-93.

3GPP, "3rd Generation Partnership Project; Technical Specification Group Services and System Aspects; Procedures for the 5G System; Stage 2 (Release 15)", 3GPP TS 23.502 V15.3.0, Sep. 2018, 1-330.

3GPP, "3rd Generation Partnership Project; Technical Specification Group Services and System Aspects; Security architecture and procedures for 5G system (Release 15)", 3GPP TS 33.501 V15.2.0 (Sep. 2018), Sep. 2018, 1-175.

3GPP, "3rd Generation Partnership Project; Technical Specification Group Services and System Aspects; System Architecture for the 5G System; Stage 2 (Release 15)", 3GPP TS 23.501 V15.3.0, Sep. 2018, 1-226.

Aboba, B., et al., "Extensible Authentication Protocol (EAP)", Network Working Group, RFC 3748, Jun. 2004, 1-67.

Arkko, J., et al., "Extensible Authentication Protocol Method for 3rd Generation Authentication and Key Agreement (EAP-AKA)", Net-work Working Group, Request for Comments: 4187, Jan. 2006, 1-79.

Arkko, J., et al., "Improved Extensible Authentication Protocol Method for 3rd Generation Authentication and Key Agreement (EAP-AKA')", Network Working Group, Request for Comments: 5448, May 2009, 1-29.

Dierks, T., et al., "The Transport Layer Security (TLS) Protocol Version 1.2", Network Working Group, Request for Comments: 5246, Aug. 2008, 1-104.

Ericsson, "New solution: Access independent architecture solution for AKMA", 3GPP TSG SA WG3 (Security) Meeting #93, S3-183562, (revision of S3-18xabc), Spokane(US), Nov. 12-16, 2018, 1-3.

Ericsson, "New solution: Stand-alone architecture solution for AKMA", 3GPP TSG SA WG3 (Security) Meeting #93, S3-183564, (revision of S3-18xabc), Spokane(US), Nov. 12-16, 2018, 1-3.

Huawei, et al., "Solution for bootstrapping authentication of AKMA", 3GPP TSG SA WG3 (Security) Meeting #93, S3-183420, (revision of S3-18xabc), Spokane (USA), Nov. 12-16, 2018, 1-4.

Simon, D., "The EAP-TLS Authentication Protocol", Network Working Group, Request for Comments: 5216, Mar. 2008, 1-34.

3GPP, "3GPP TR 33.899 V0.6.0", 3rd Generation Partnership Project; Technical Specification Group Services and System Aspects; Study on the security aspects of the next generation system (Release 14), Nov. 2016, 375 pages.

* cited by examiner

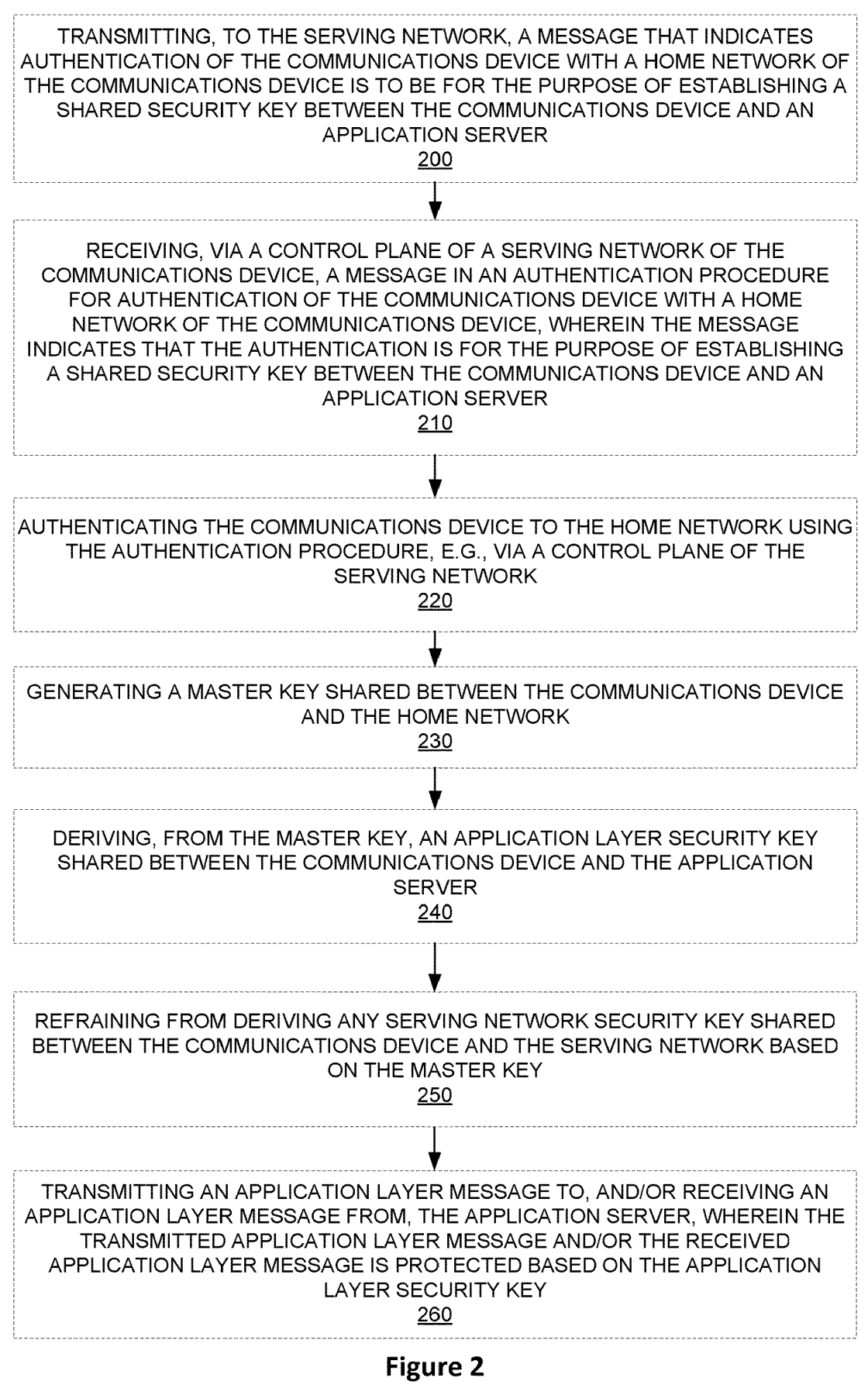

TRANSMITTING, TO THE SERVING NETWORK, A MESSAGE THAT INDICATES
AUTHENTICATION OF THE COMMUNICATIONS DEVICE WITH A HOME NETWORK OF
THE COMMUNICATIONS DEVICE IS TO BE FOR THE PURPOSE OF ESTABLISHING A
SHARED SECURITY KEY BETWEEN THE COMMUNICATIONS DEVICE AND AN
APPLICATION SERVER
200

RECEIVING, VIA A CONTROL PLANE OF A SERVING NETWORK OF THE
COMMUNICATIONS DEVICE, A MESSAGE IN AN AUTHENTICATION PROCEDURE
FOR AUTHENTICATION OF THE COMMUNICATIONS DEVICE WITH A HOME
NETWORK OF THE COMMUNICATIONS DEVICE, WHEREIN THE MESSAGE
INDICATES THAT THE AUTHENTICATION IS FOR THE PURPOSE OF ESTABLISHING
A SHARED SECURITY KEY BETWEEN THE COMMUNICATIONS DEVICE AND AN
APPLICATION SERVER
210

AUTHENTICATING THE COMMUNICATIONS DEVICE TO THE HOME NETWORK USING
THE AUTHENTICATION PROCEDURE, E.G., VIA A CONTROL PLANE OF THE
SERVING NETWORK
220

GENERATING A MASTER KEY SHARED BETWEEN THE COMMUNICATIONS DEVICE
AND THE HOME NETWORK
230

DERIVING, FROM THE MASTER KEY, AN APPLICATION LAYER SECURITY KEY
SHARED BETWEEN THE COMMUNICATIONS DEVICE AND THE APPLICATION
SERVER
240

REFRAINING FROM DERIVING ANY SERVING NETWORK SECURITY KEY SHARED
BETWEEN THE COMMUNICATIONS DEVICE AND THE SERVING NETWORK BASED
ON THE MASTER KEY
250

TRANSMITTING AN APPLICATION LAYER MESSAGE TO, AND/OR RECEIVING AN
APPLICATION LAYER MESSAGE FROM, THE APPLICATION SERVER, WHEREIN THE
TRANSMITTED APPLICATION LAYER MESSAGE AND/OR THE RECEIVED
APPLICATION LAYER MESSAGE IS PROTECTED BASED ON THE APPLICATION
LAYER SECURITY KEY
260

Figure 2

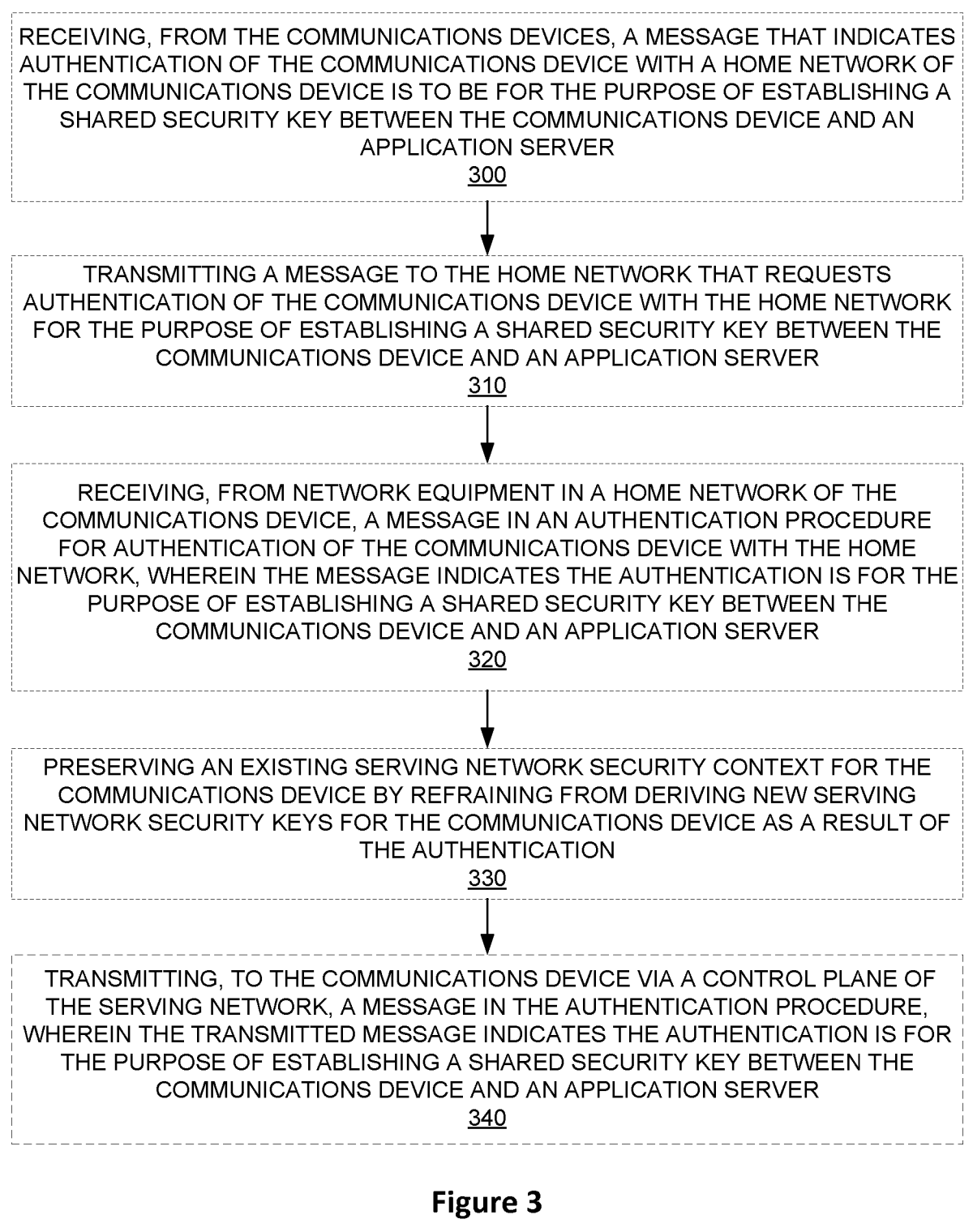

RECEIVING, FROM THE COMMUNICATIONS DEVICES, A MESSAGE THAT INDICATES
AUTHENTICATION OF THE COMMUNICATIONS DEVICE WITH A HOME NETWORK OF
THE COMMUNICATIONS DEVICE IS TO BE FOR THE PURPOSE OF ESTABLISHING A
SHARED SECURITY KEY BETWEEN THE COMMUNICATIONS DEVICE AND AN
APPLICATION SERVER
300

TRANSMITTING A MESSAGE TO THE HOME NETWORK THAT REQUESTS
AUTHENTICATION OF THE COMMUNICATIONS DEVICE WITH THE HOME NETWORK
FOR THE PURPOSE OF ESTABLISHING A SHARED SECURITY KEY BETWEEN THE
COMMUNICATIONS DEVICE AND AN APPLICATION SERVER
310

RECEIVING, FROM NETWORK EQUIPMENT IN A HOME NETWORK OF THE
COMMUNICATIONS DEVICE, A MESSAGE IN AN AUTHENTICATION PROCEDURE
FOR AUTHENTICATION OF THE COMMUNICATIONS DEVICE WITH THE HOME
NETWORK, WHEREIN THE MESSAGE INDICATES THE AUTHENTICATION IS FOR THE
PURPOSE OF ESTABLISHING A SHARED SECURITY KEY BETWEEN THE
COMMUNICATIONS DEVICE AND AN APPLICATION SERVER
320

PRESERVING AN EXISTING SERVING NETWORK SECURITY CONTEXT FOR THE
COMMUNICATIONS DEVICE BY REFRAINING FROM DERIVING NEW SERVING
NETWORK SECURITY KEYS FOR THE COMMUNICATIONS DEVICE AS A RESULT OF
THE AUTHENTICATION
330

TRANSMITTING, TO THE COMMUNICATIONS DEVICE VIA A CONTROL PLANE OF
THE SERVING NETWORK, A MESSAGE IN THE AUTHENTICATION PROCEDURE,
WHEREIN THE TRANSMITTED MESSAGE INDICATES THE AUTHENTICATION IS FOR
THE PURPOSE OF ESTABLISHING A SHARED SECURITY KEY BETWEEN THE
COMMUNICATIONS DEVICE AND AN APPLICATION SERVER
340

Figure 3

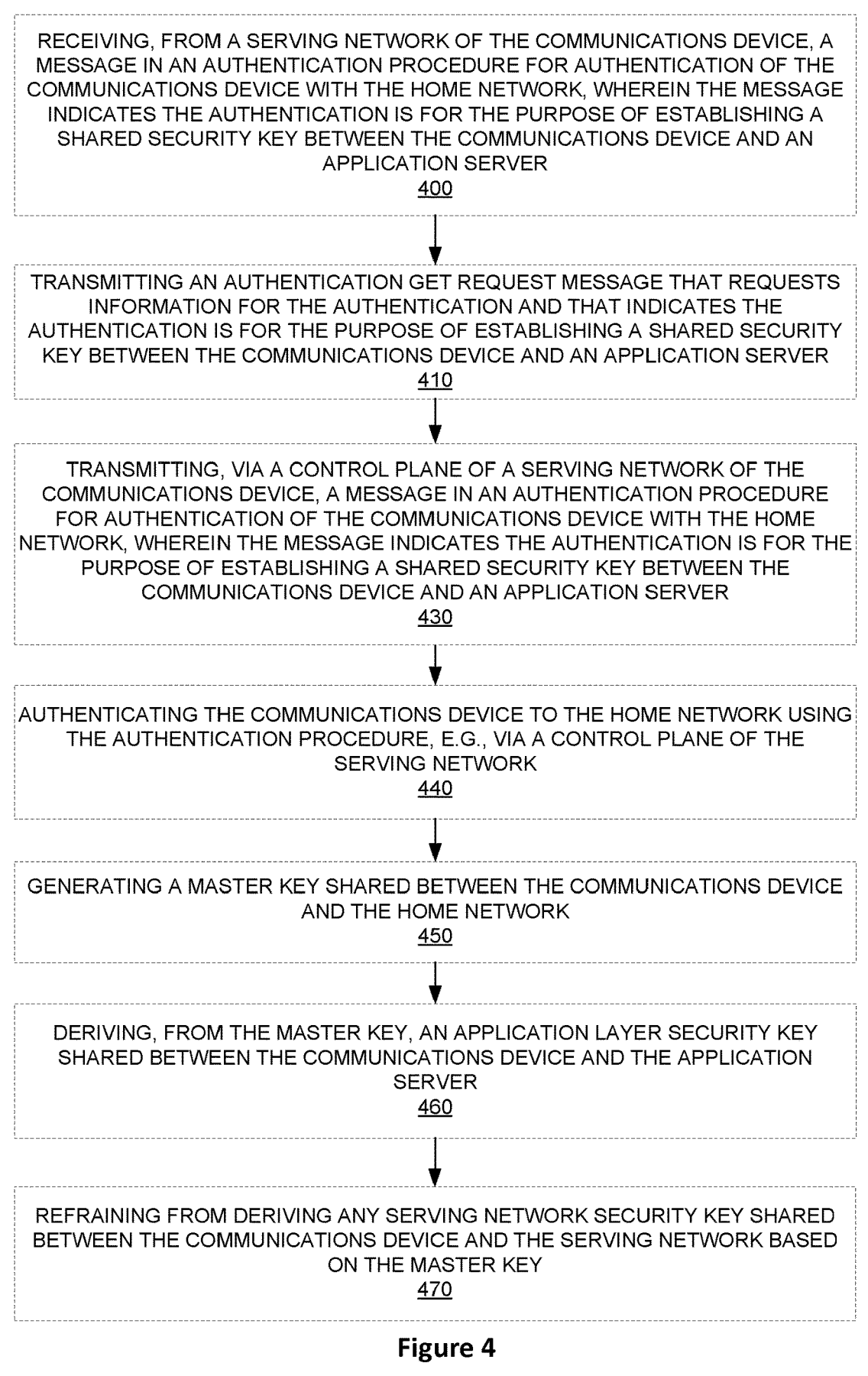

RECEIVING, FROM A SERVING NETWORK OF THE COMMUNICATIONS DEVICE, A MESSAGE IN AN AUTHENTICATION PROCEDURE FOR AUTHENTICATION OF THE COMMUNICATIONS DEVICE WITH THE HOME NETWORK, WHEREIN THE MESSAGE INDICATES THE AUTHENTICATION IS FOR THE PURPOSE OF ESTABLISHING A SHARED SECURITY KEY BETWEEN THE COMMUNICATIONS DEVICE AND AN APPLICATION SERVER
400

TRANSMITTING AN AUTHENTICATION GET REQUEST MESSAGE THAT REQUESTS INFORMATION FOR THE AUTHENTICATION AND THAT INDICATES THE AUTHENTICATION IS FOR THE PURPOSE OF ESTABLISHING A SHARED SECURITY KEY BETWEEN THE COMMUNICATIONS DEVICE AND AN APPLICATION SERVER
410

TRANSMITTING, VIA A CONTROL PLANE OF A SERVING NETWORK OF THE COMMUNICATIONS DEVICE, A MESSAGE IN AN AUTHENTICATION PROCEDURE FOR AUTHENTICATION OF THE COMMUNICATIONS DEVICE WITH THE HOME NETWORK, WHEREIN THE MESSAGE INDICATES THE AUTHENTICATION IS FOR THE PURPOSE OF ESTABLISHING A SHARED SECURITY KEY BETWEEN THE COMMUNICATIONS DEVICE AND AN APPLICATION SERVER
430

AUTHENTICATING THE COMMUNICATIONS DEVICE TO THE HOME NETWORK USING THE AUTHENTICATION PROCEDURE, E.G., VIA A CONTROL PLANE OF THE SERVING NETWORK
440

GENERATING A MASTER KEY SHARED BETWEEN THE COMMUNICATIONS DEVICE AND THE HOME NETWORK
450

DERIVING, FROM THE MASTER KEY, AN APPLICATION LAYER SECURITY KEY SHARED BETWEEN THE COMMUNICATIONS DEVICE AND THE APPLICATION SERVER
460

REFRAINING FROM DERIVING ANY SERVING NETWORK SECURITY KEY SHARED BETWEEN THE COMMUNICATIONS DEVICE AND THE SERVING NETWORK BASED ON THE MASTER KEY
470

Figure 4

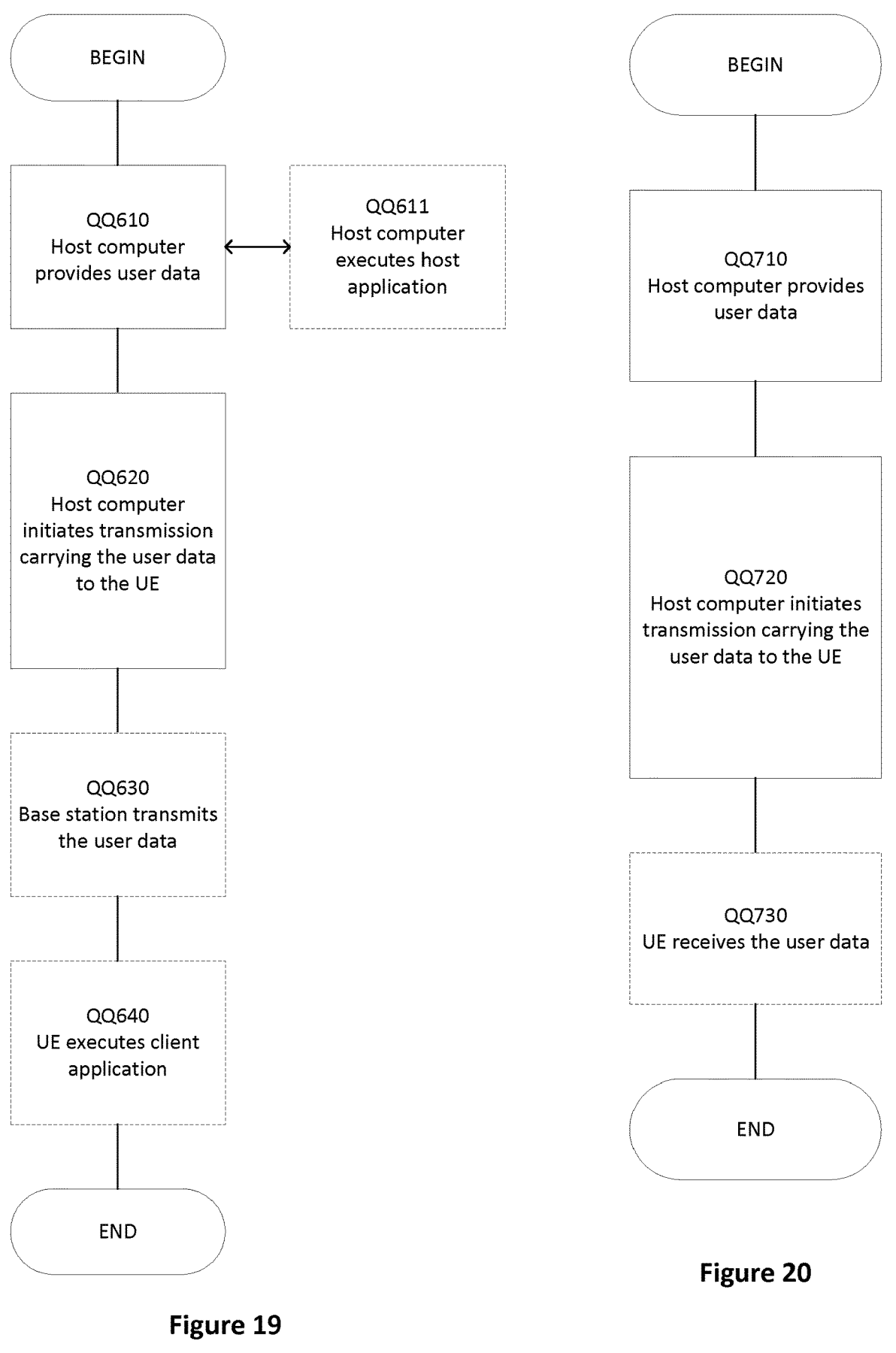

BEGIN

QQ610
Host computer
provides user data

⟷

QQ611
Host computer
executes host
application

QQ620
Host computer
initiates transmission
carrying the user data
to the UE

QQ630
Base station transmits
the user data

QQ640
UE executes client
application

END

Figure 19

BEGIN

QQ710
Host computer provides
user data

QQ720
Host computer initiates
transmission carrying the
user data to the UE

QQ730
UE receives the user data

END

Figure 20

AUTHENTICATION OF A COMMUNICATIONS DEVICE

TECHNICAL FIELD

The present application relates generally to a wireless communication system, and particular relates to authentication of a communications device.

BACKGROUND

A communications device typically needs to authenticate itself to its home network in order to obtain communications service. This authentication may also trigger the serving network (e.g., which may be different than the home network) to generate security keys for protecting communications with the serving network. Challenges exist therefore in leveraging authentication with the home network for other purposes that do not impact the serving network key hierarchy.

SUMMARY

Some embodiments include a method performed by a communications device. The method may comprise receiving, via a control plane of a serving network of the communications device, a message in an authentication procedure for authentication of the communications device with a home network of the communications device. The message in some embodiments indicates that the authentication is for the purpose of establishing a shared security key between the communications device and an application server. Running primary authentication via the control plane of the serving network may advantageously ensure that the authentication policy or key hierarchy of the serving network are not impacted. This new authentication type produces a key only in the UE and home network, which can then be used as a master key for applications.

Some embodiments further include a method performed by a communications device. The method may comprise transmitting, to a serving network of the communications device, a message that indicates authentication of the communications device with a home network of the communications device is to be for the purpose of establishing a shared security key between the communications device and an application server.

Some embodiments include a method performed by network equipment configured for use in a home network of a communications device. The method may comprise transmitting, via a control plane of a serving network of the communications device, a message in an authentication procedure for authentication of the communications device with the home network. The message in some embodiments indicates that the authentication is for the purpose of establishing a shared security key between the communications device and an application server.

Some embodiments further include a method performed by network equipment configured for use in a home network of a communications device. The method may comprise receiving, from a serving network of the communications device, a message in an authentication procedure for authentication of the communications device with the home network. The message in some embodiments indicates that the authentication is for the purpose of establishing a shared security key between the communications device and an application server.

Some embodiments may include a method performed by network equipment configured for use in a serving network of a communications device. The method may comprise receiving, from network equipment in a home network of the communications device, a message in an authentication procedure for authentication of the communications device with the home network. The message in some embodiments indicates that the message indicates the authentication is for the purpose of establishing a shared security key between the communications device and an application server.

Some embodiments further include a method performed by network equipment configured for use in a serving network of a communications device. The method may comprise receiving, from the communications device, a message that indicates authentication of the communications device with a home network of the communications device is to be for the purpose of establishing a shared security key between the communications device and an application server.

Some embodiments also include a communications device. The communications device comprises processing circuitry and memory. The memory contains instructions executable by the processing circuitry whereby the communications device is configured to receive, via a control plane of a serving network of the communications device, a message in an authentication procedure for authentication of the communications device with a home network of the communications device. The message in some embodiments indicates that the authentication is for the purpose of establishing a shared security key between the communications device and an application server.

Some embodiments also include a communications device. The communications device comprises processing circuitry and memory. The memory contains instructions executable by the processing circuitry whereby the communications device is configured to transmit, to a serving network of the communications device, a message that indicates authentication of the communications device with a home network of the communications device is to be for the purpose of establishing a shared security key between the communications device and an application server.

Some embodiments also include a network equipment configured for use in a home network of a communications device. The network equipment comprises processing circuitry and memory. The memory contains instructions executable by the processing circuitry whereby the network equipment is configured to transmit, via a control plane of a serving network of the communications device, a message in an authentication procedure for authentication of the communications device with the home network. The message in some embodiments indicates that the authentication is for the purpose of establishing a shared security key between the communications device and an application server.

Some embodiments also include a network equipment configured for use in a home network of a communications device. The network equipment comprises processing circuitry and memory. The memory contains instructions executable by the processing circuitry whereby the network equipment is configured to receive, from a serving network of the communications device, a message in an authentication procedure for authentication of the communications device with the home network. The message in some embodiments indicates that the authentication is for the purpose of establishing a shared security key between the communications device and an application server.

Some embodiments also include a network equipment configured for use in a serving network of a communications device. The network equipment comprises processing circuitry and memory. The memory contains instructions executable by the processing circuitry whereby the network equipment is configured to receive, from network equipment in a home network of the communications device, a message in an authentication procedure for authentication of the communications device with the home network. The message in some embodiments indicates that the message indicates the authentication is for the purpose of establishing a shared security key between the communications device and an application server.

Some embodiments also include a network equipment configured for use in a serving network of a communications device. The network equipment comprises processing circuitry and memory. The memory contains instructions executable by the processing circuitry whereby the network equipment is configured to receive, from the communications device, a message that indicates authentication of the communications device with a home network of the communications device is to be for the purpose of establishing a shared security key between the communications device and an application server.

Embodiments also include corresponding computer programs, and carriers. A computer program comprises instructions which, when executed on at least one processor of an apparatus, cause the apparatus to carry out any of the embodiments described above. Embodiments further include a carrier containing such a computer program. This carrier may comprise one of an electronic signal, optical signal, radio signal, or computer readable storage medium.

BRIEF DESCRIPTION OF THE DRAWINGS

The inventive concept is now described, by way of example, with reference to the accompanying drawings, in which:

FIG. 2 is a logic flow diagram of a method performed by a communication device according to some embodiments.

FIG. 3 is a logic flow diagram of a method performed by network equipment configured for use in a serving network of a communication device according to some embodiments.

FIG. 4 is a logic flow diagram of a method performed by network equipment configured for use in a home network of a communication device according to some embodiments.

4

Figure 12:
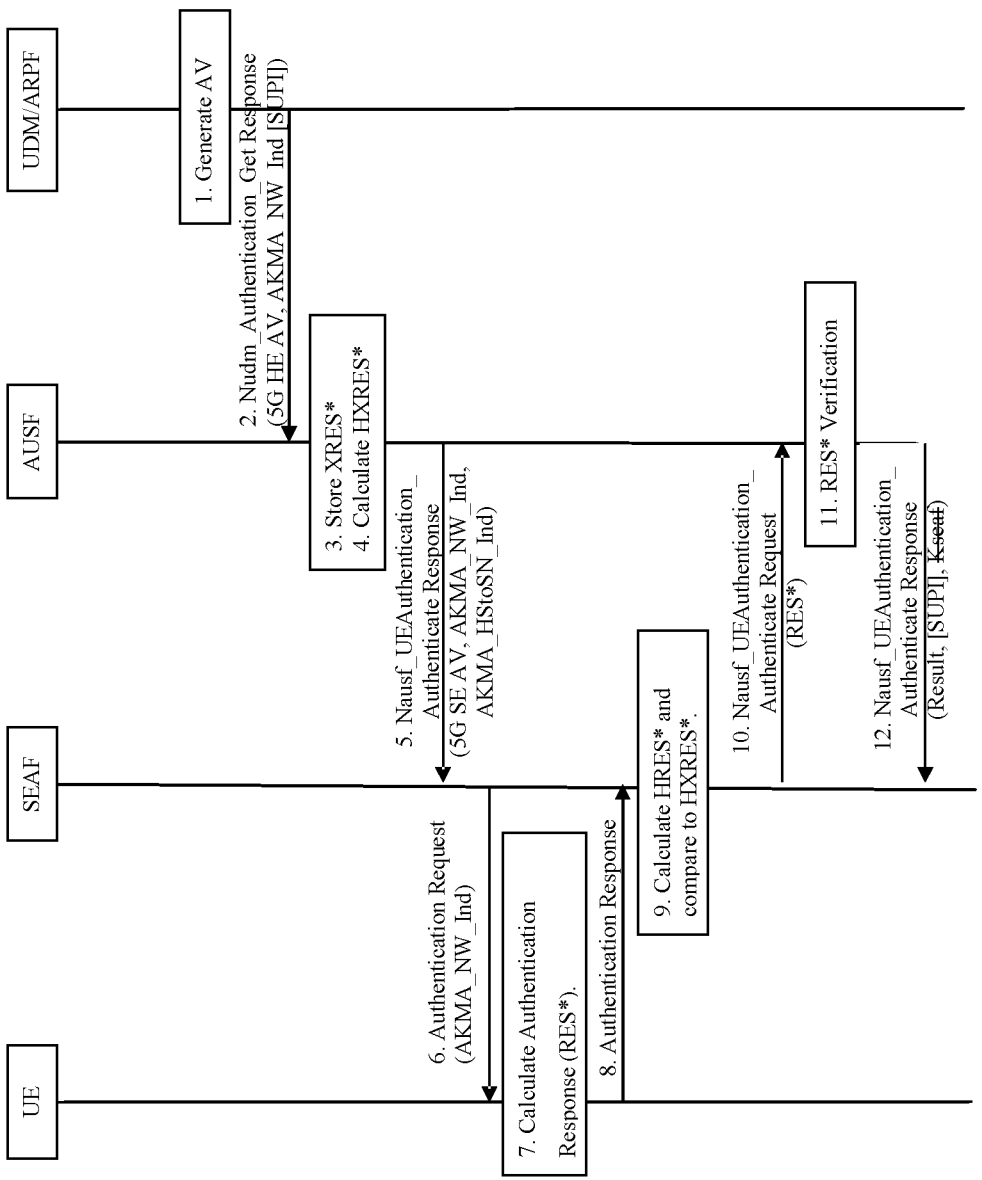

FIG. 12 is a signalling diagram of a revised version of authentication procedure for EAP-AKA according to some embodiments.

Figure 13:
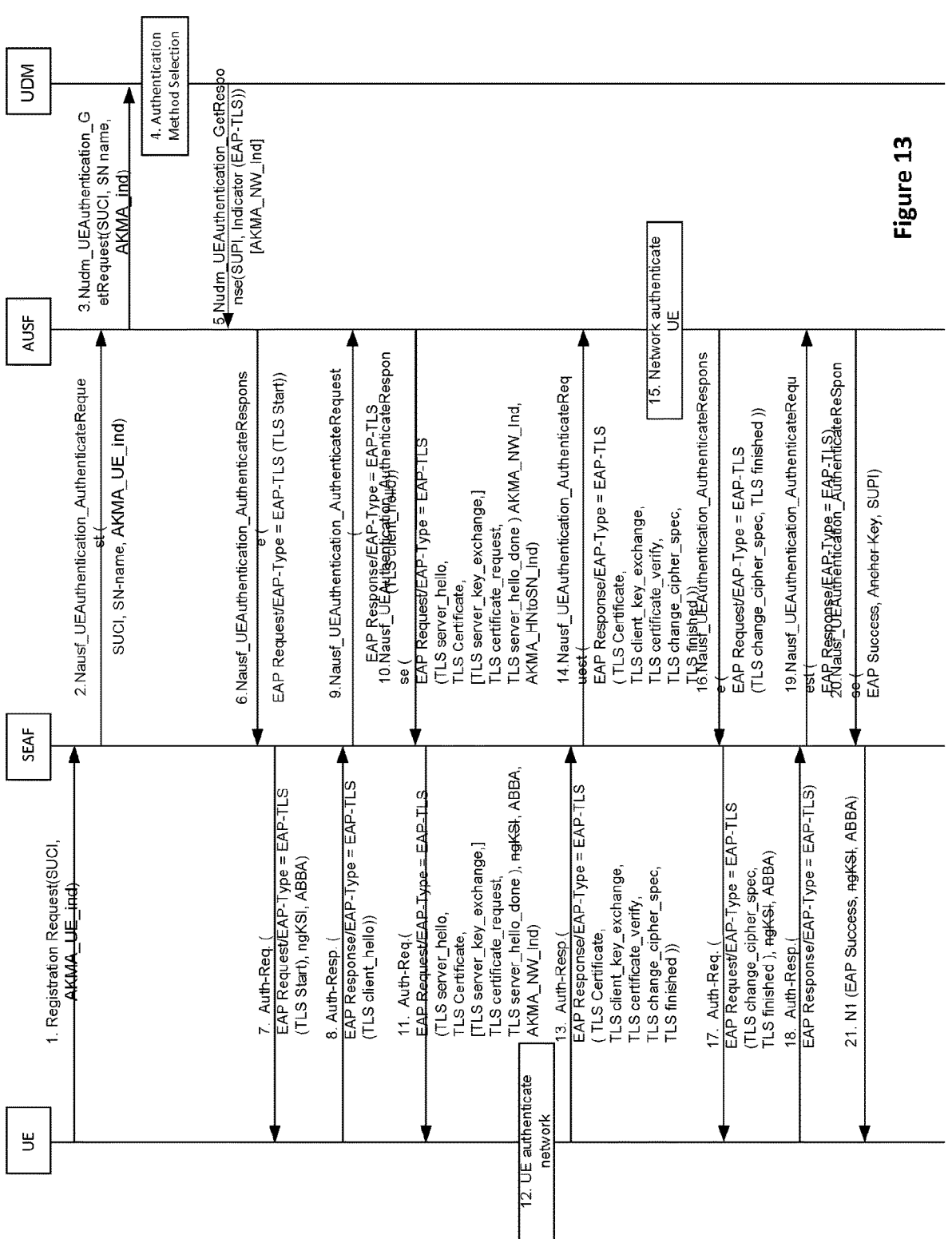

FIG. 13 is a signalling diagram of a unified authentication framework from 3GPP TS 33.501 v.15.2.0.

Figure 14:
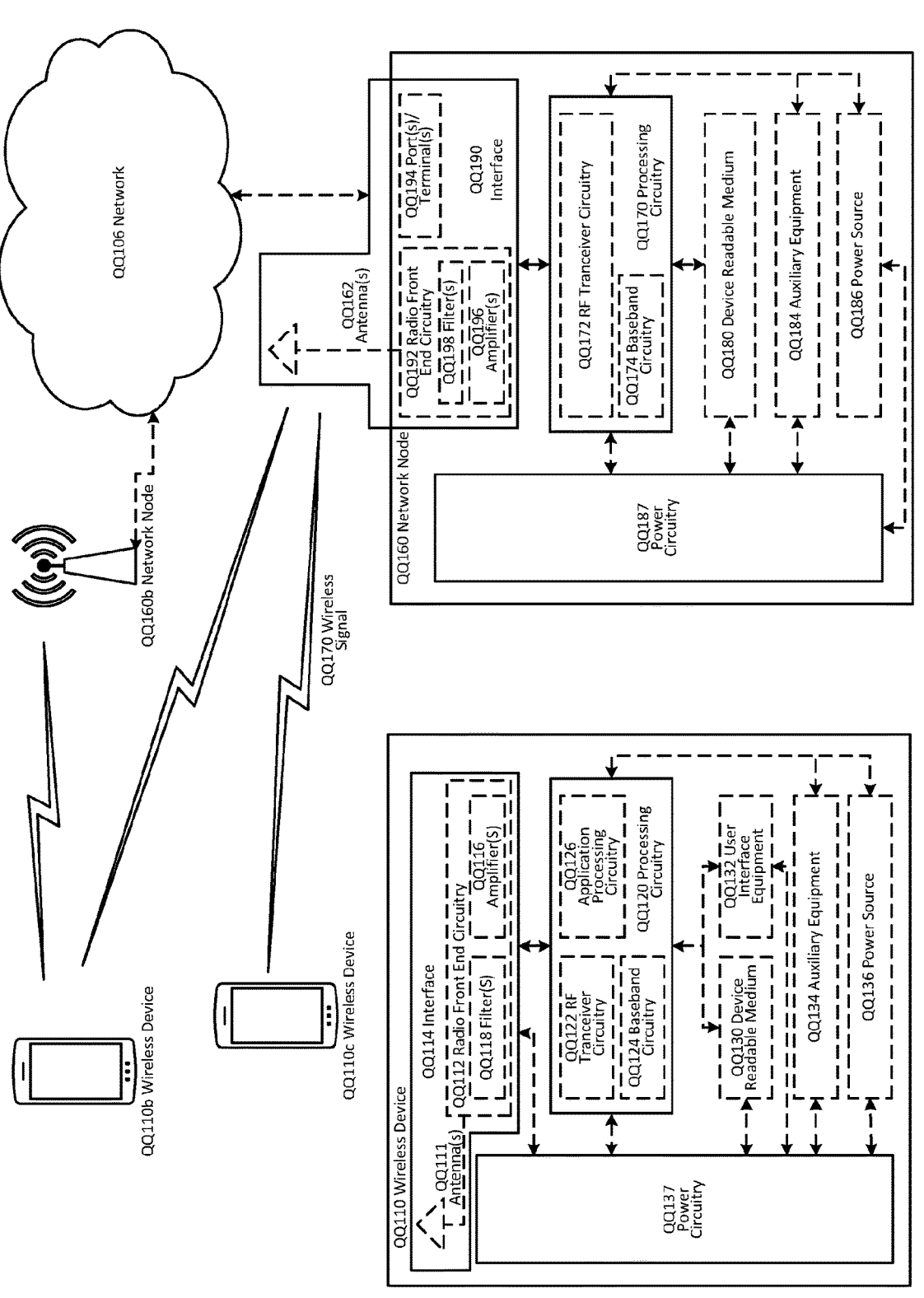

FIG. 14 is a block diagram of a wireless network according to some embodiments.

Figure 15:
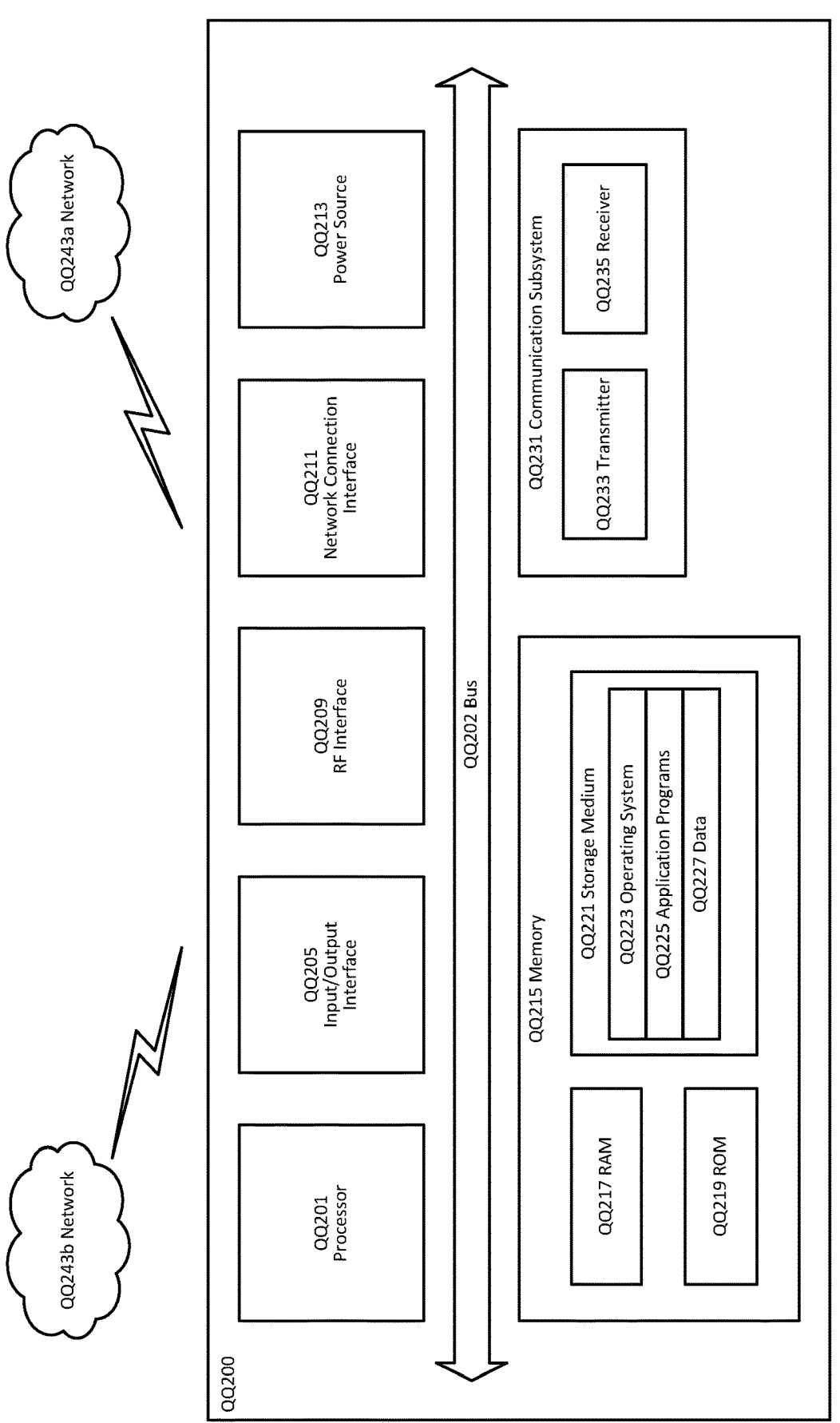

FIG. 15 is a block diagram of a UE according to some embodiments.

Figure 16:
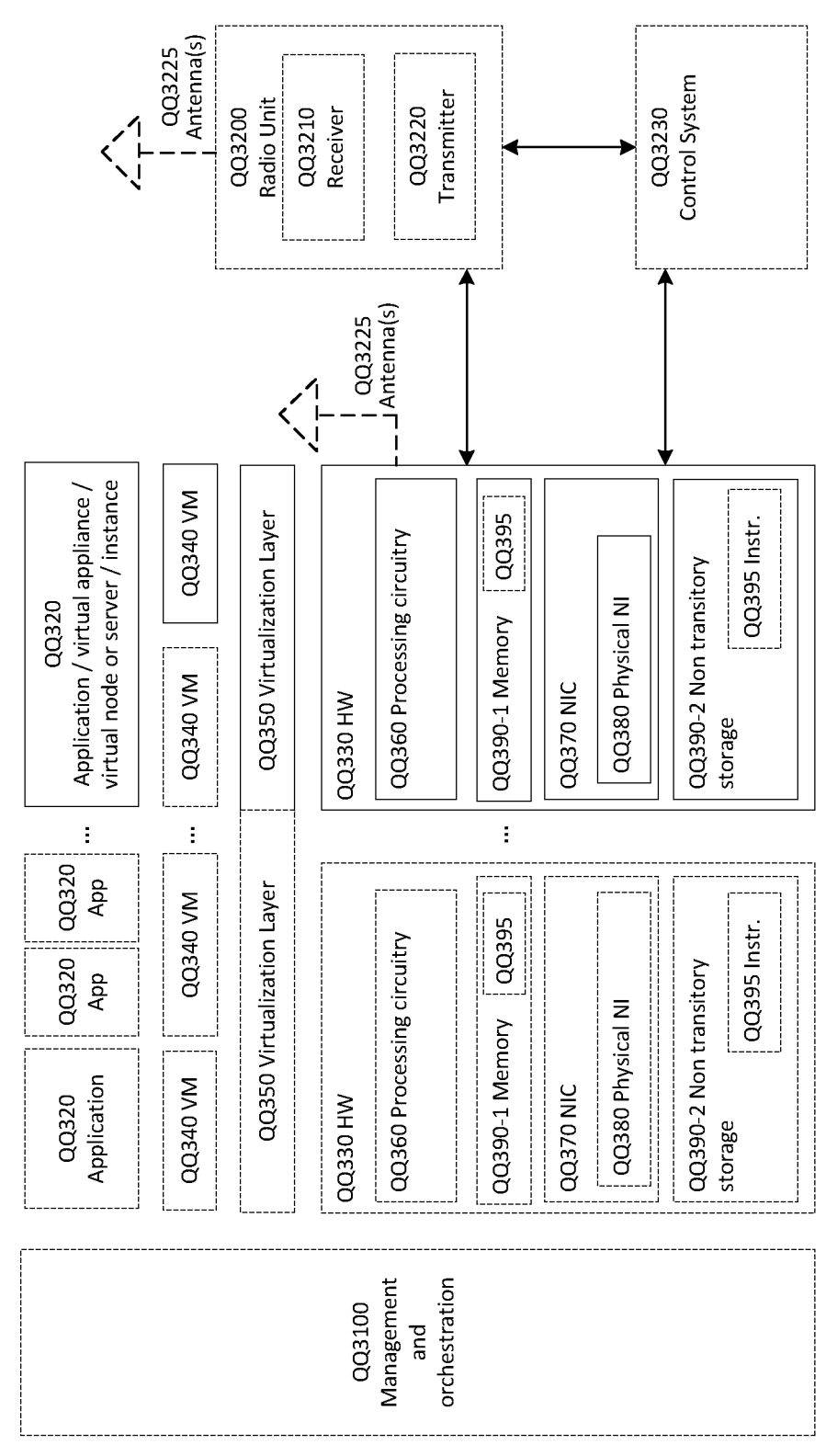

FIG. 16 is a schematic block diagram illustrating a virtualization environment according to some embodiments.

Figure 17:
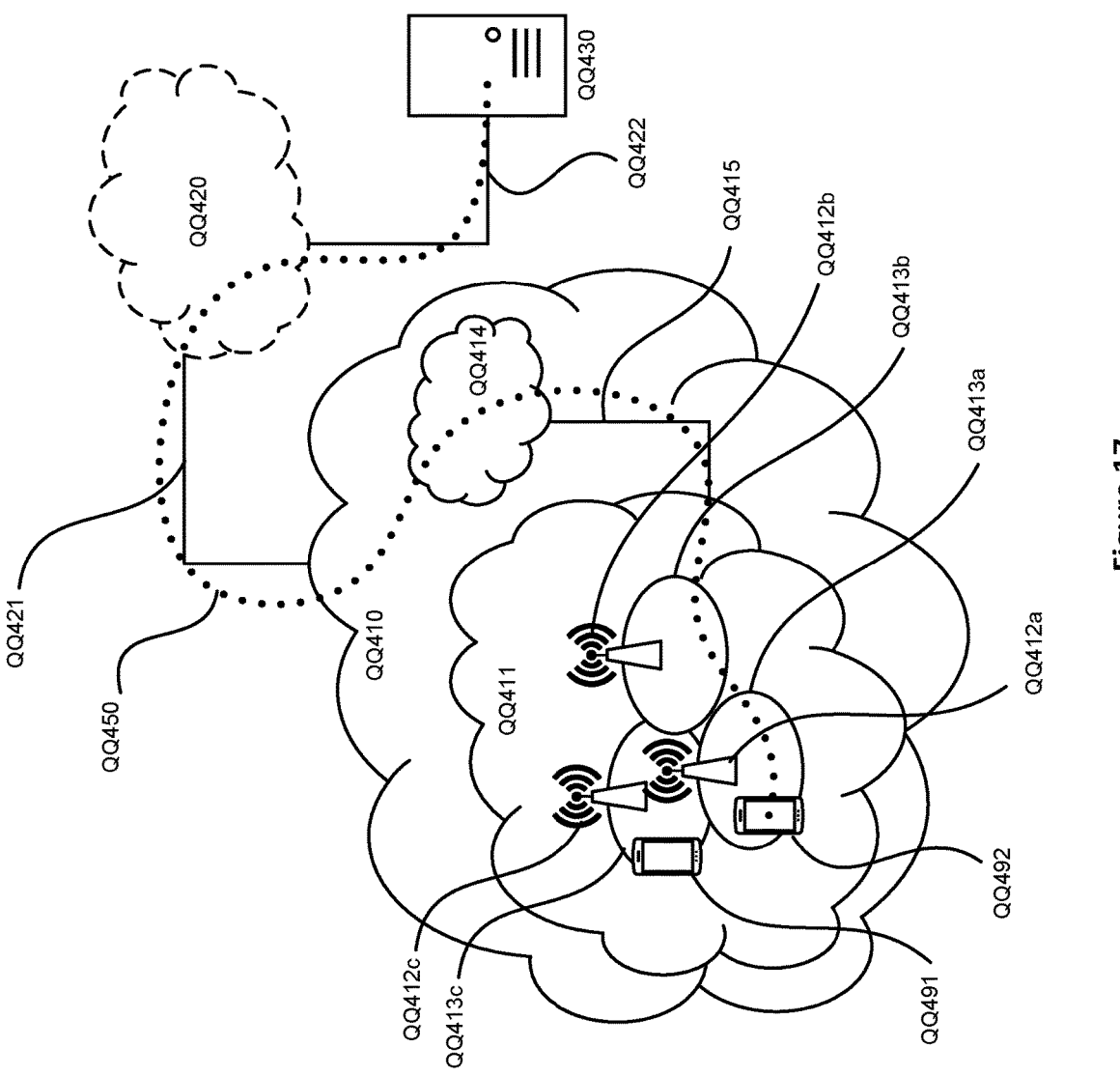

FIG. 17 is a block diagram of telecommunication network connected via an intermediate network to a host computer according to some embodiments.

Figure 18:
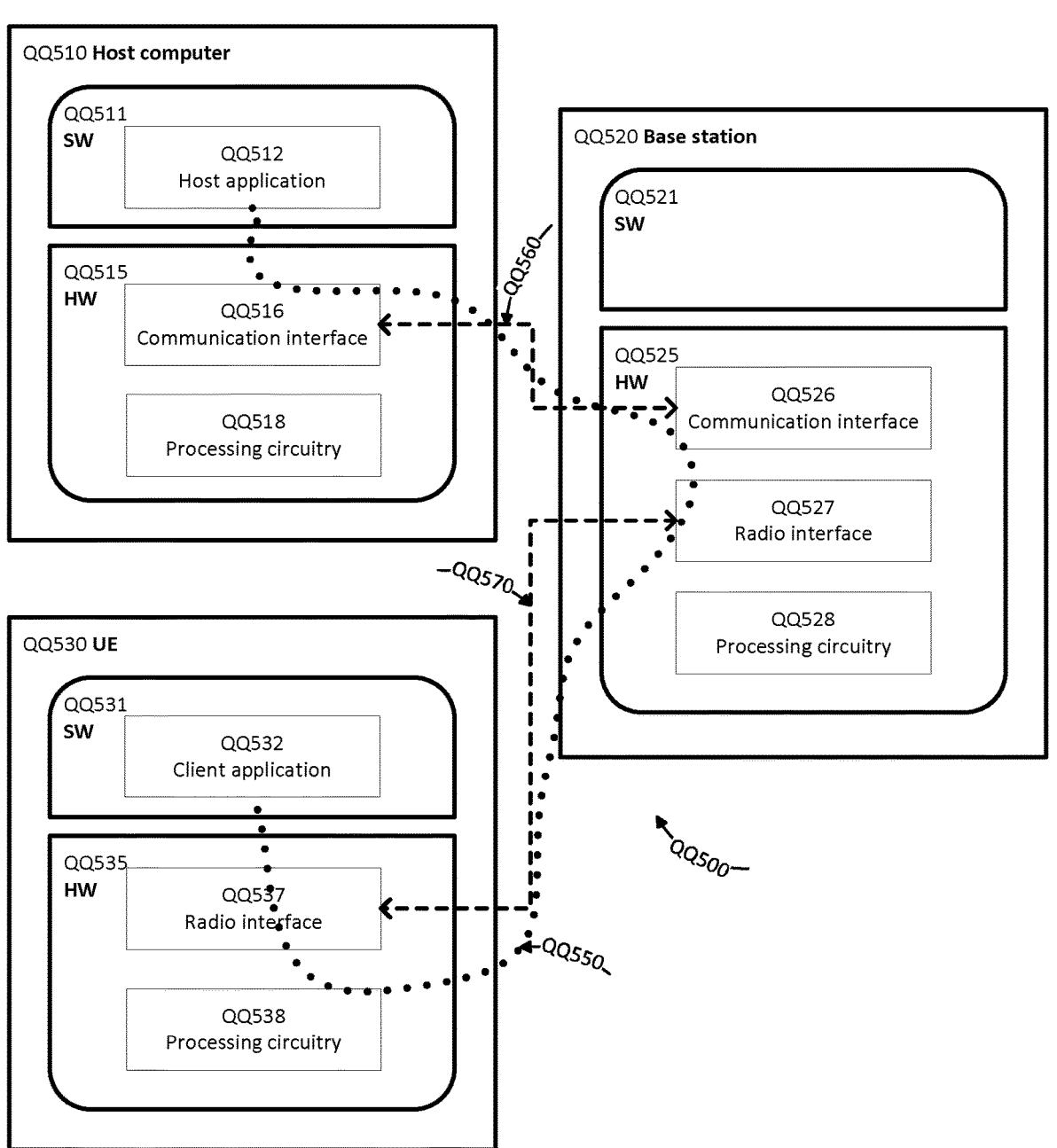

FIG. 18 is a block diagram of host computer according to some embodiments.

FIG. 19 is a flowchart illustrating a method implemented in a communication system, in accordance with one embodiment.

FIG. 20 is a flowchart illustrating a method implemented in a communication system, in accordance with one embodiment.

Figures 21, 22:
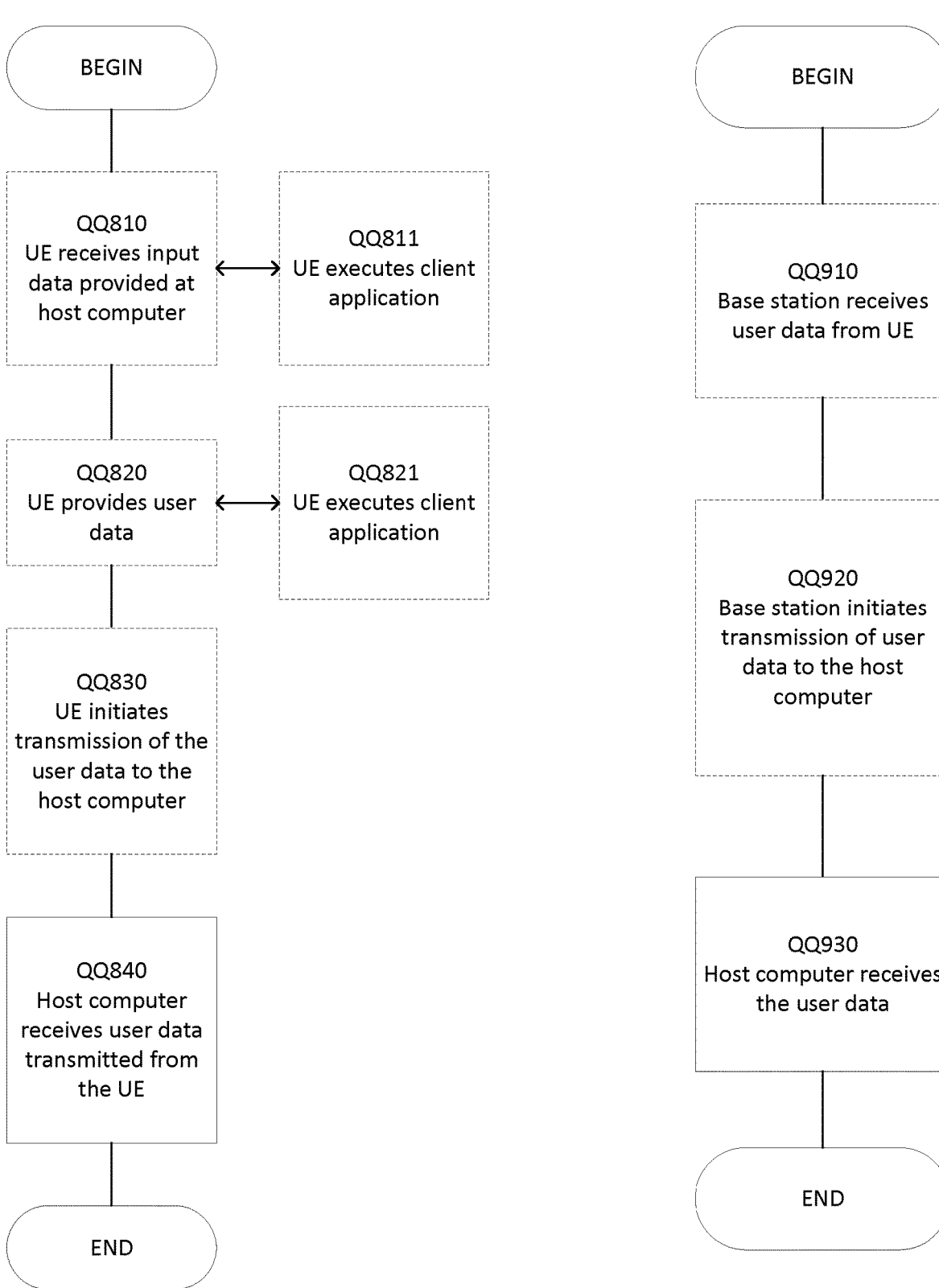

FIG. 21 is a flowchart illustrating a method implemented in a communication system, in accordance with one embodiment.

FIG. 22 is a flowchart illustrating a method implemented in a communication system, in accordance with one embodiment.

DETAILED DESCRIPTION

Figure 1:
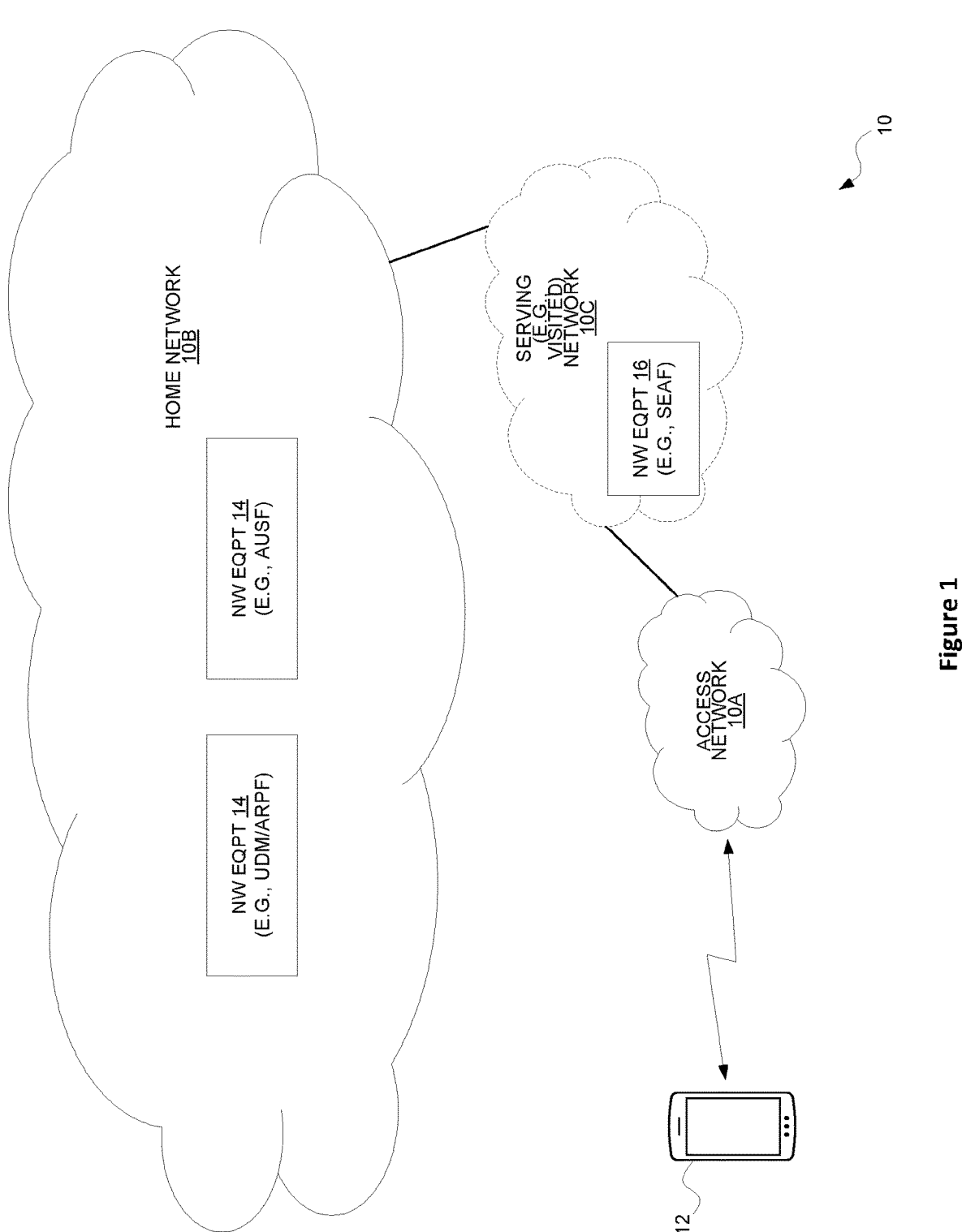
FIG. 1 is a block diagram of a wireless communication system according to some embodiments.

FIG. 1 shows a communication system (e.g., a 5G system) 10 according to some embodiments in which a communications device 12 is a wireless communications device (or simply "wireless device"). The communication system 10 includes a radio access network (RAN) 10A via which the communication device 12 connects to a serving core network (CN) 100. FIG. 1 shows that the serving core network (e.g., a visited network) 100 includes network equipment (NW EQPT) 16. The communications device also has a home network 10B which includes network equipment (NW EQPT) 14. The communication system 10 could be a 5G network, the network equipment 14 may implement an data management (UDM), an authentication data repository and processing function (ARPF) or an authentication server function, and the network equipment 16 may implement an security anchor function.

FIG. 2 depicts a method performed by a communications device 12 (e.g., a wireless device, such as a user equipment, UE) accordance with particular embodiments. Blocks in dashed lines are optional. The method in some embodiments may include transmitting a message (e.g., a service request message or a registration request message) to a serving network of the communications device (Block 200). The message indicates (e.g., via auth_purpose_ind_UE in FIG. 8 or AMKA_UE_ind in FIGS. 10 and 13) authentication of the communications device with a home network of the communications device is to be for the purpose of establishing a shared security key between the communications device and an application server (Block 200). This may also be expressly more succinctly as being for application layer purposes, or for the purpose of securing communications between the communications device and an application server. The message in some embodiments may be a request message that requests registration with or service from the serving network. For example, the request message may be the Request sent from the UE to the SEAF in FIG. 8, the <N1 message> in FIG. 10, or the Registration Request from the UE to the SEAF in FIG. 13.

In some embodiments, the message additionally or alternatively includes receiving, via a control plane of a serving network of the communications device, a message in an authentication procedure for authentication of the communications device with a home network of the communications device (Block 210). The message may indicate that the authentication is for the purpose of establishing a shared security key between the communications device and an application server. In some embodiments, the message is an authentication request message that requests the communications device to authenticate itself with the home network. For example, the message may be a non-access stratum, NAS, authentication request message, e.g., the Authentication Request from the SEAF to the UE in FIG. 8, the Auth. Req. from the SEAF to the UE in FIG. 11, the Authentication Request from the SEAF to the UE in FIG. 12, or the Auth-Req in Step 11 of FIG. 13. As another example, the message may be an extensible authentication protocol, EAP, request message or an authentication and key agreement, AKA, challenge message. In fact, in some embodiments, the EAP request message or AKA challenge message may be included in or encapsulated in such a NAS request message just described. In some embodiments, the method may also include authenticating the communications device to the home network, e.g., using the authentication procedure (Block 220). This may for instance be performed via a control plane of the serving network.

In some embodiments, the method further includes generating a master key shared between the communications device and the home network (Block 230). In one or more such embodiments, this generation may be performed after the communications device authenticates itself to the home network. In some embodiments, the master key is a key Kausf that is shared between the communications device and an authentication server function, AUSF. In other embodiments, the master key is a key Kbsf that is shared between the communications device and a bootstrapping server function, BSF.

In some embodiments, the method also includes deriving, from the master key, an application layer security key shared between the communications device and the application server (Block 240). This derivation in some embodiments may be performed based on the purpose of the authentication being for establishing a shared security key between the communications device and an application server. In some embodiments, the method further includes refraining from deriving any serving network security key shared between the communications device and the serving network based on the master key (Block 250). This may be performed as part of an overall process to preserve the serving network security key hierarchy. In some embodiments, the method also includes transmitting an application layer message to, and/or receiving an application layer message from, the application server (Block 260). The transmitted application layer message and/or the received application layer message may be protected based on the application layer security key. This may be performed as part of securing communication between the communications device and the application server (e.g., over the user plane or control plane) based on the application layer security key.

FIG. 3 depicts a method performed by network equipment 16 configured for use in a serving (e.g., visited) network of a wireless device. The network equipment 16 may for instance implement the SEAF in any of FIGS. 8-13. Alternatively, in other embodiments not shown, the network equipment 16 may correspond to AMF or SMF. Blocks in dashed lines are optional.

The method in some embodiments may include receiving a message from the communications device (Block 300). The message indicates (e.g., via auth_purpose_ind_UE in FIG. 8 or AMKA_UE_ind in FIGS. 10 and 13) authentication of the communications device with a home network of the communications device is to be for the purpose of establishing a shared security key between the communications device and an application server. This may also be expressly more succinctly as being for application layer purposes, or for the purpose of securing communications between the communications device and an application server. The message in some embodiments may be a request message that requests registration with or service from the serving network. For example, the request message may be the Request sent from the UE to the SEAF in FIG. 8, the <N1 message> in FIG. 10, or the Registration Request from the UE to the SEAF in FIG. 13.

The method may alternatively or additionally include (e.g., based on the received message from the communications device) transmitting a message to the home network that requests authentication of the communications device with the home network for the purpose of establishing a shared security key between the communications device and an application server (Block 310). This transmitted message may correspond for instance to the Authentication Request from the SEAF to AUSF in FIG. 8, or to Nausf_UEAuthentication_Authenticate Request in FIG. 10 or FIG. 13. In this case, the message may indicate this, e.g., via auth_purpose_ind_UE in FIG. 8 or AMKA_UE_ind in FIGS. 10 and 13.

In some embodiment, the method additionally or alternatively includes receiving, from network equipment 14 in a home network of the communications device, a message in an authentication procedure for authentication of the communications device with the home network (Block 320). This received message may indicate the authentication is for the purpose of establishing a shared security key between the communications device and an application server. The received message may in some embodiments be an authentication response message. For example, the received message may be the Authentication Response from the AUSF to the SEAF in FIG. 8, or the Nausf_UEAuthentication_Authenticate Response from the AUSF to the SEAF in FIG. 11, 12, or 13. In this case, the message may indicate this via the AKMA_NW_Ind or (e.g., if the SEAF cannot read the AKMA_NW_Ind) the AKMA_HNtoSN_Ind.

In some embodiments, the method may include preserving an existing serving network security context for the communications device by refraining from deriving new serving network security keys for the communications device as a result of the authentication (Block 330). This preservation may be based on authentication of the communications device with the home network being for the purpose of establishing a shared security key between the communications device and an application server, e.g., rather than primary authentication.

In some embodiments, the method alternatively or additionally includes transmitting, to the communications device via a control plane of the serving network, a message in the authentication procedure (Block 340). The message may indicate the authentication is for the purpose of establishing a shared security key between the communications device and an application server. In some embodiments, the message is an authentication request message that requests the communications device to authenticate itself with the home network. For example, the message may be a non-access stratum, NAS, authentication request message, e.g., the Authentication Request from the SEAF to the UE in FIG. 8, the Auth. Req. from the SEAF to the UE in FIG. 11, the Authentication Request from the SEAF to the UE in FIG. 12, or the Auth-Req in Step 11 of FIG. 13. As another example, the message may be an extensible authentication protocol, EAP, request message or an authentication and key agreement, AKA, challenge message. In fact, in some embodiments, the EAP request message or AKA challenge message may be included in or encapsulated in such a NAS request message just described.

FIG. 4 depicts a method performed by network equipment 14 configured for use in a home network of a wireless device. The network equipment 14 may for instance implement the AUSF in any of FIGS. 8-13. Alternatively, in other embodiments not shown, the network equipment 14 may correspond to BSF. Blocks in dashed lines are optional.

The method in some embodiments may include receiving, from a serving network of the communications device, a message in an authentication procedure for authentication of the communications device with the home network (Block 400). The message indicates the authentication is for the purpose of establishing a shared security key between the communications device and an application server. In some embodiments, the message is an authentication request message that requests the communications device to authenticate itself with the home network. For example, the message may correspond to the Authentication Request in FIG. 8, or the Nausf_UEAuthentication_Authenticate Request message from the SEAF to AUSF in FIG. 10, 11, or 13.

In some embodiments, the method alternatively or additionally includes (e.g., based on the received message) transmitting an authentication get request message that requests information for the authentication and that indicates the authentication is for the purpose of establishing a shared security key between the communications device and an application server (Block 410). This message may correspond for instance to the Authetnication Request from the AUSF to the UDM/ARPF in FIG. 8, or the Nudm_UEAuthentication_Get_Request from the AUSF to the UDM/ARPF/SIDF in FIG. 10 or 13.

In some embodiments, the method alternatively or additionally includes transmitting, via a control plane of a serving network of the communications device, a message in an authentication procedure for authentication of the communications device with the home network (Block 430). The message in some embodiments indicates the authentication is for the purpose of establishing a shared security key between the communications device and an application server. In some embodiments, the message is an authentication request message that requests the communications device to authenticate itself with the home network. As an example, the message may be an extensible authentication protocol, EAP, request message or an authentication and key agreement, AKA, challenge message. In some embodiments, the EAP request message or AKA challenge message may be included in or encapsulated in such a NAS request message described above. The message in some embodiments is or is included in the Authentication Response of FIG. 8, or is or is included in the Nausf_UEAuthentication_Authenticate_Response of FIG. 11, 12, or 13, or is or is included in the EAP Request/AKA'-Challenge in FIG. 11, 12, or 13.

In some embodiments, the method may also include authenticating the communications device to the home network, e.g., using the authentication procedure (Block 440). This may for instance be performed via a control plane of the serving network.

In some embodiments, the method further includes generating a master key shared between the communications device and the home network (Block 450). In one or more such embodiments, this generation may be performed after the communications device authenticates itself to the home network. In some embodiments, the master key is a key Kausf that is shared between the communications device and an authentication server function, AUSF. In other embodiments, the master key is a key Kbsf that is shared between the communications device and a bootstrapping server function, BSF.

In some embodiments, the method also includes deriving, from the master key, an application layer security key shared between the communications device and the application server (Block 460). This derivation in some embodiments may be performed based on the purpose of the authentication being for establishing a shared security key between the communications device and an application server. In some embodiments, the method further includes refraining from deriving any serving network security key shared between the communications device and the serving network based on the master key (Block 470). This may be performed as part of an overall process to preserve the serving network security key hierarchy. Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
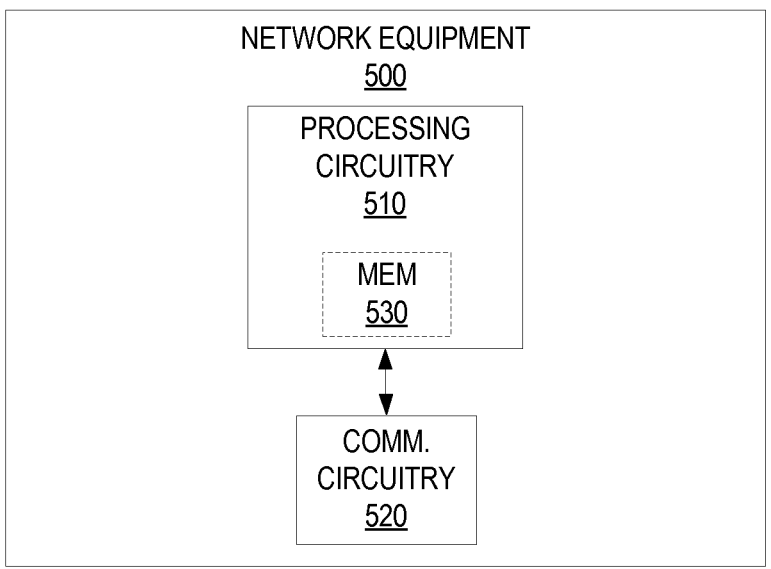
FIG. 5 is a block diagram of network equipment configured for use in a home network of a communications device according to other embodiments.

FIG. 5 illustrates network equipment 500 configured for use in a home network of a communications device as implemented in accordance with one or more embodiments. As shown, the network equipment 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, e.g., in FIG. 4, such as by executing instructions stored in memory 530. The processing circuitry 510 in this regard may implement certain functional means, units, or modules.

Figure 6:
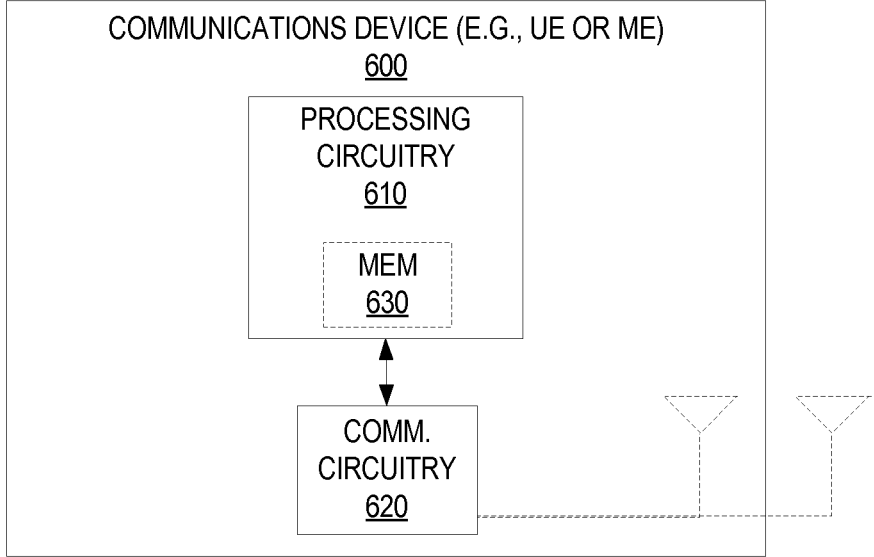
FIG. 6 is a block diagram of a communications device according to other embodiments.

FIG. 6 illustrates a communications device 600 (e.g., wireless device 12, UE, or ME) as implemented in accordance with one or more embodiments. As shown, the communications device 600 includes processing circuitry 610 and communication circuitry 620. The communication circuitry 620 (e.g., radio circuitry) is configured to transmit and/or receive information to and/or from one or more other nodes, e.g., via any communication technology. Such communication may occur via one or more antennas that are either internal or external to the communications device 600. The processing circuitry 610 is configured to perform processing described above (e.g., in FIG. 2), such as by executing instructions stored in memory 630. The processing circuitry 610 in this regard may implement certain functional means, units, or modules.

Figure 7:
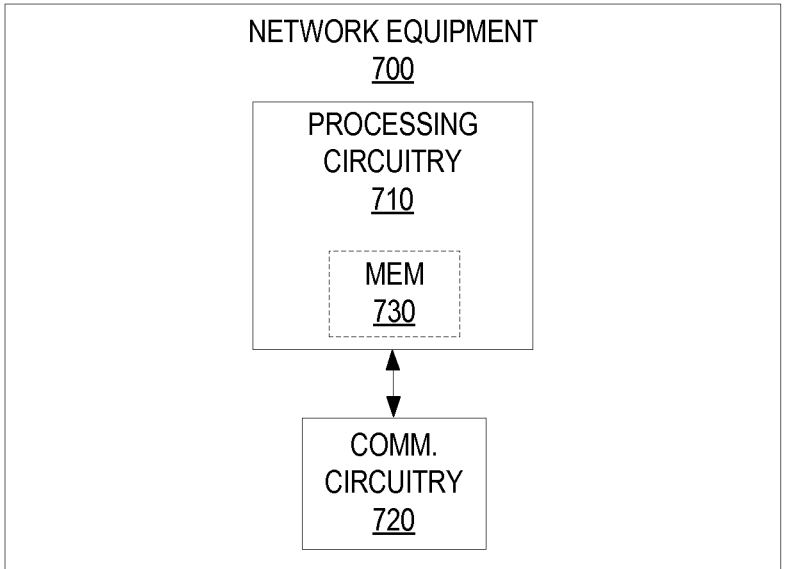
FIG. 7 is a block diagram of network equipment configured for use in a serving network of a communications device according to other embodiments.

FIG. 7 illustrates network equipment 700 configured for use in a serving network of a communications device as implemented in accordance with one or more embodiments. As shown, the network equipment 700 includes processing circuitry 710 and communication circuitry 720. The communication circuitry 720 is configured to transmit and/or receive information to and/or from one or more other nodes, e.g., via any communication technology. The processing circuitry 710 is configured to perform processing described above, e.g., in FIG. 3, such as by executing instructions stored in memory 730. The processing circuitry 710 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above. Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium. Additional embodiments will now be described. At least some of these embodiments may be described as applicable in certain contexts and/or wireless network types for illustrative purposes, but the embodiments are similarly applicable in other contexts and/or wireless network types not explicitly described.

5G primary authentication for network access is defined in clauses 6.1.3.1 (EAP-AKA'), 6.1.3.2 (5G AKA) and B.2.1 of TS 33.501 v.15.2.0.

Generic Bootstrapping Architecture (GBA) bootstrapping for getting key material for applications is defined in the GBA specification TS 33.220 v15.3.0. In GBA bootstrapping, the UE runs authentication with the home network and the resulting key is used as a master key from which further keys can be derived for applications to use.

A GBA-like key distribution mechanism could be developed using the 5G architecture. The mechanism may be called Authentication and Key Management for Applications (AKMA).

GBA as defined in TS 33.220 requires the use of hypertext transfer protocol (HTTP) digest authentication and key agreement (AKA) to run the bootstrapping. Resource constrained internet-of-things (IoT) devices typically do not support HTTP, but lightweight protocols like constrained application protocol (CoAP). Therefore, there is currently no way how those IoT devices could perform GBA bootstrapping. Another possibility could be to run the primary authentication when the IoT device needs fresh keys for its applications. However, the serving network is in charge when to run authentication and therefore this option would interfere with the authentication policy and key hierarchy of the serving network.

Some embodiments propose to run primary authentication via the control plane of the serving network, but in such a way that the authentication policy or key hierarchy of the serving network are not impacted. This new authentication type produces a key only in the home network, which can then be used as a master key for applications. This is achieved by sending an indication from the UE to the network and from the network to the UE.

Figure 8:
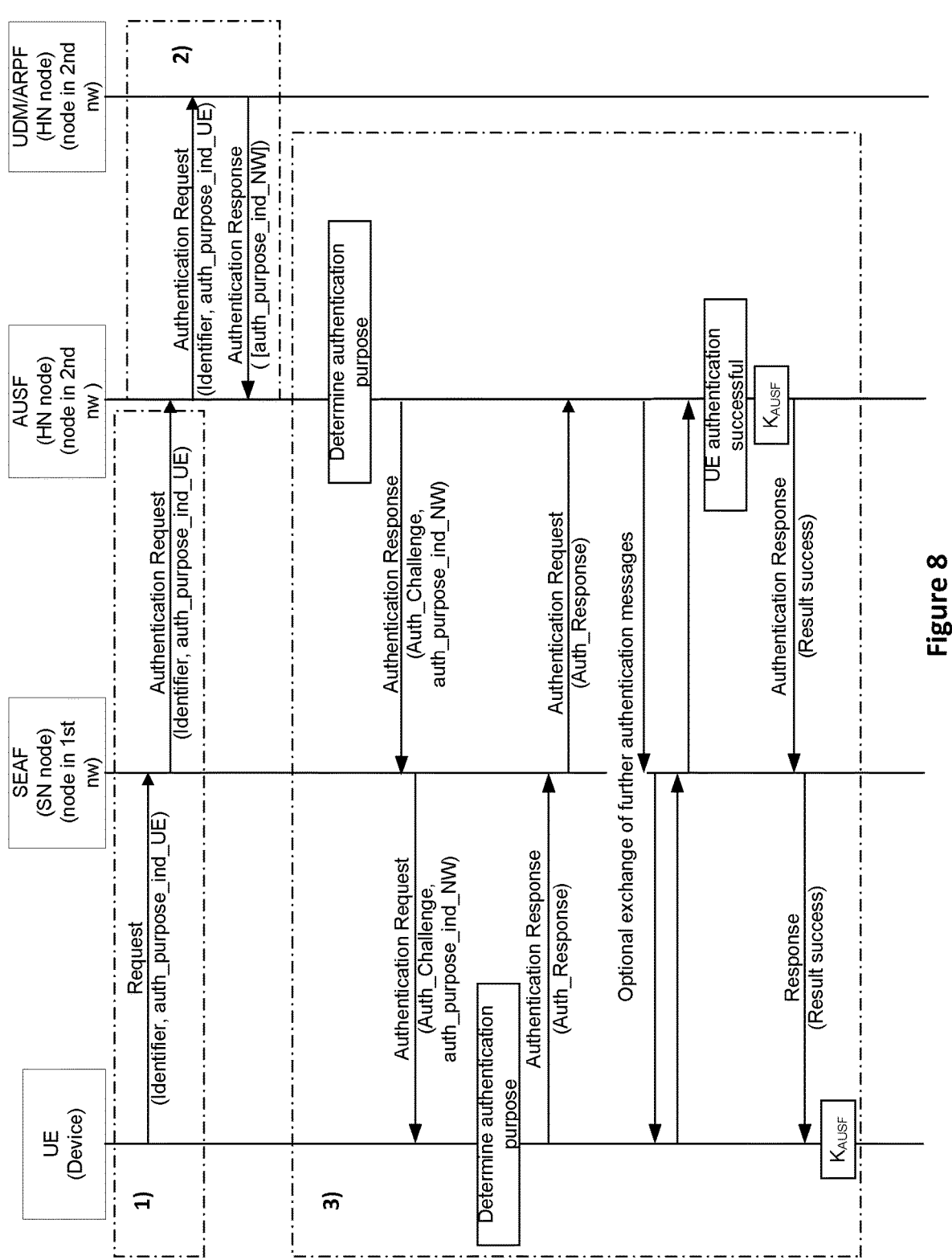
FIG. 8 is a signalling diagram of authentication process solution according to some embodiments.

The authentication process in some embodiments can be logically divided into three main parts, as shown in FIG. 8.
1) UE requesting authentication
2) Authentication server contacting the database or key repository
3) The actual authentication procedure initiated by the authentication server Note that these parts may be implemented together or separately. For example, some embodiments only include part 3 if the authentication method is known to or decided by the AUSF and the trigger to run AKMA authentication comes from an application server and not from the SEAF or UE.

In some embodiments, the purpose of the process is to run authentication between the UE and home network, which produces a key in the UE and in the home network. The key can then be used to derive further keys to be used between the UE and application servers.

The terminology of the 5G network is used, but alternative (more general) terminology could be used as well and is shown in FIG. 8. The names of the messages are generalized versions of the 5G message names.

Part 1:

The UE sends a Request message to the security anchor function (SEAF) including an identifier and an indication (auth_purpose_ind_UE) that it wants to run AKMA authentication. (The term AKMA authentication is used to refer to this solution to distinguish it from primary authentication.) In one embodiment, the home public land mobile network (HPLMN) has configured the universal subscriber identity module (USIM) of the UE with the indication that the HPLMN supports the AKMA authentication feature.

The SEAF, after receiving the message, sends an Authentication Request message to the authentication server function (AUSF) including an identifier and an indication of AKMA authentication (auth_purpose_ind_UE). If the SEAF does not support AKMA authentication, it may send an error message to the UE.

The UE may indicate the AKMA authentication to SEAF in any way. And the SEAF may indicate the AKMA authentication to AUSF in any way. For example:

UE-SEAF: The indication can be a new filed in existing non-access stratum (NAS) message (e.g. Register request) or it can be a completely new NAS message (e.g. AMKA-Register request).

SEAF-AUSF: The indication can be a new filed in existing Nausf_UEAuthentication_Authenticate Request or a completely new service published by AUSF (e.g. Nausf_U-EAutentication_AMKA_Authenticate Request).

Part 2:

The AUSF sends an Authentication Request message to the unified data management (UDM)/authentication data repository and processing function (ARPF) including the identifier and indication of AKMA authentication (auth_purpose_ind_UE). The UDM/ARPF decides on the authentication method to be used. For some authentication methods, e.g. AKA-based, the UDM/ARPF generates an AKMA authentication indication to be sent to the UE (auth_purpose_ind_NW).

The UDM/ARPF sends Authentication Response message to the AUSF including auth_purpose_ind_NW and authentication material depending on the selected authentication method.

The AUSF may indicate the AKMA authentication to UDM in any way. For example, the indication can be a new field or a new value in an existing field in the existing Nudm_UEAuthentication_Get_Request or a completely new service published by UDM (e.g. Nudm_UEAuthentication_AMKA_Get_Request).

Part 3:

The AUSF determines that it needs to run AKMA authentication with the UE. In one embodiment the trigger for AKMA authentication comes from the UE via the SEAF as shown in part 1). In some other embodiments the trigger may come from other entities such as other network functions.

The AUSF sends an Authentication Response message to the SEAF. In one embodiment, the SEAF has earlier subscribed to AMKA authentication service, and is expecting notification to start the authentication with the UE. The message includes an authentication challenge (Auth_Challenge, whose meaning depends on the used authentication method, e.g. EAP-TLS start) and an indication that this is an AKMA authentication (auth_purpose_ind_NW). In one embodiment the auth_purpose_ind_NW is the one received from the UDM/ARPF. In some other embodiments the AUSF does not receive it and it may generate the auth_purpose_ind_NW itself. In some embodiments the auth_purpose_ind_NW is carried inside the authentication method specific message, and therefore the SEAF may not be able to interpret it. In those embodiments the AUSF needs to send another auth_purpose_ind_NW in a form which is understandable to the SEAF.

The SEAF receives the message and determines from the auth_purpose_ind_NW that it is an AKMA authentication and not a primary authentication and this means that the authentication will not impact the key hierarchy in the serving network. The SEAF sends to the UE an Authentication Request including the Auth_Challenge (whose meaning depends on the used authentication method) and auth_purpose_ind_NW.

When the UE receives the Authentication Request, it determines from the auth_purpose_ind_NW that it is an AKMA authentication and not a primary authentication. This means that the authentication will not impact the key hierarchy in the serving network. But, in some embodiments, it will produce a key Kausf in the UE and in the AUSF. The UE performs tasks depending on the authentication method.

The UE sends Authentication Response to the SEAF including Auth_Response. The meaning of the Auth_Response depends on the used authentication method.

The SEAF sends Authentication Request to the AUSF including Auth_Response. The meaning of the Auth_Response depends on the used authentication method. One or more further authentication messages may be exchanged between the UE and AUSF via the SEAF.

When the authentication of the UE is completed, the AUSF possesses a key Kausf produced from the AKMA authentication procedure. The AUSF sends Authentication Response to the SEAF including successful result indication. The AUSF does not send any keys to the SEAF with the message (as in the case of primary authentication it would).

The SEAF sends a Response to the UE indicating success of AKMA authentication. At the end of the AKMA authentication procedure, the UE possesses a key Kausf.

Architecture Alternatives

Figures 9A, 9B, 9C:
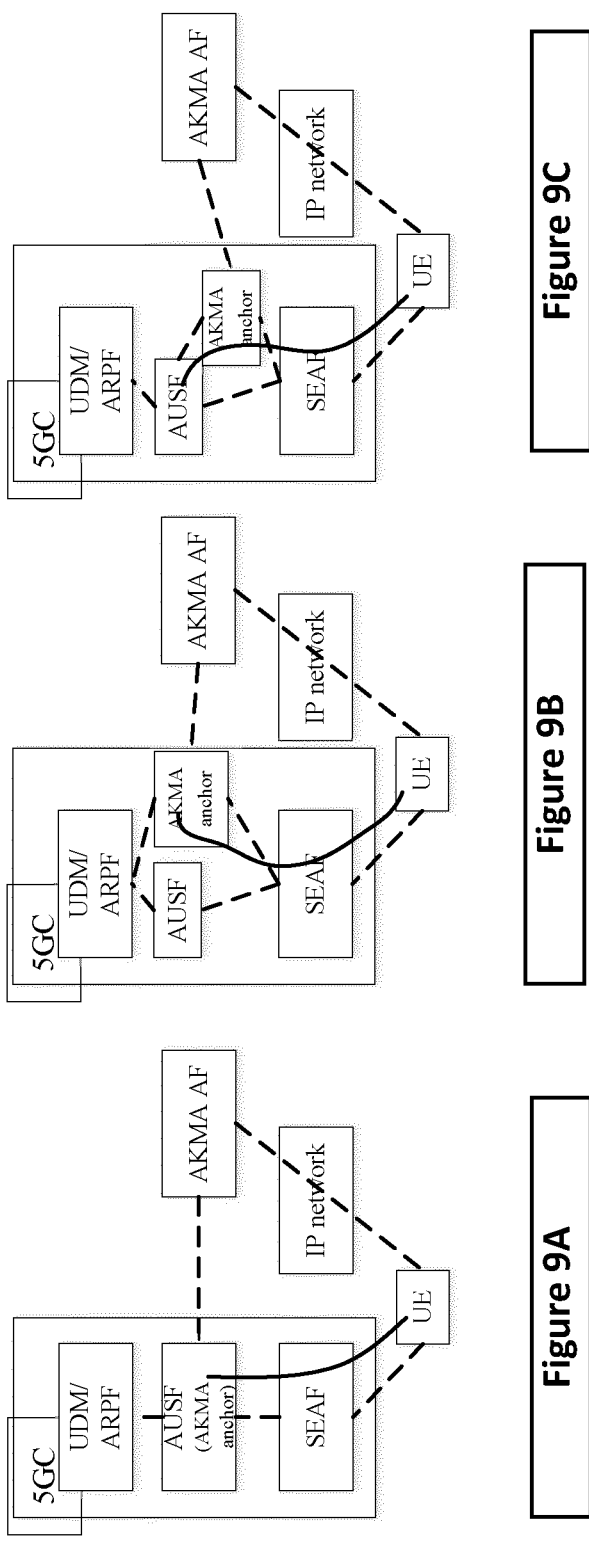
FIG. 9A-9C are different architectural alternatives between which entities to run AKMA authentication via the SEAF according to some embodiments.

There are different possible architectural alternatives between which entities to run AKMA authentication via the SEAF (shown by the blue line in FIGS. 9A, 9B, and 9C for the different architectural alternatives). The current description is according to architecture 1 (FIG. 9A).

Architecture 2 (FIG. 9B) is basically the same as architecture 1, but the AKMA anchor performs the tasks previously performed by the AUSF.

In Architecture 3 (FIG. 9C), the AKMA anchor is between the AUSF and SEAF. In this case the AKMA anchor is in the home network and basically conveys the messages between the AUSF and SEAF. At the end of the AKMA authentication, the AKMA anchor will receive a key from the AUSF which is derived from Kausf.

The following embodiments are described on top of existing 5G authentication methods in TS 33.501: EAP-AKA', 5G AKA and EAP-TLS.

Figure 10:
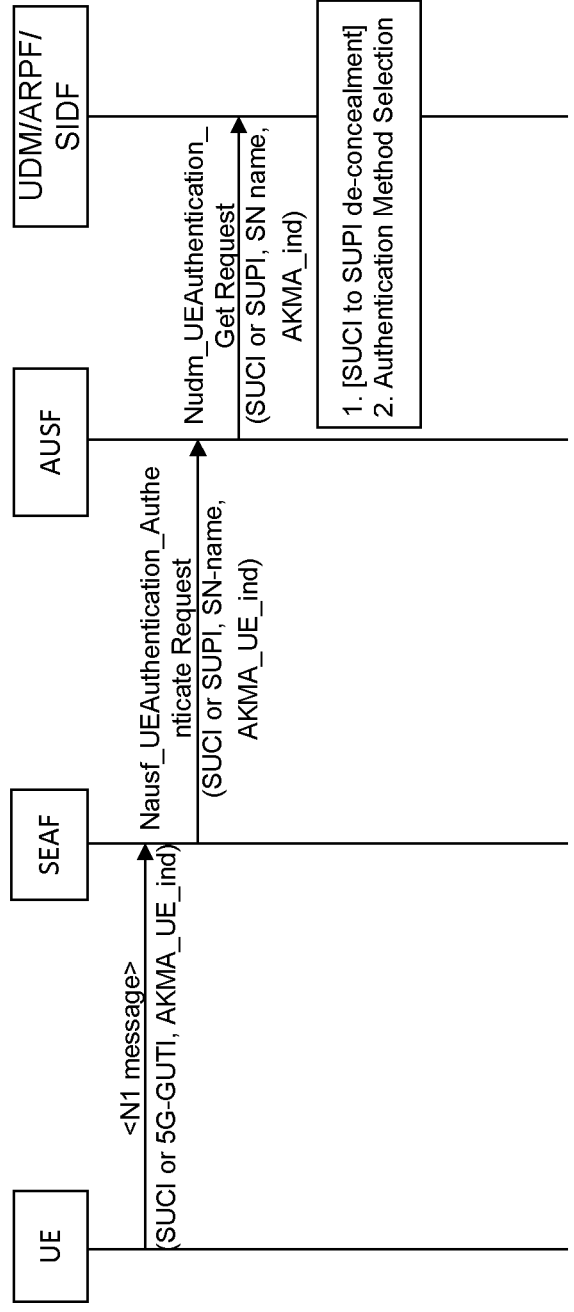
FIG. 10 is a signalling diagram of revised version of Initiation of authentication procedure and selection of authentication method according to some embodiments.

The initiation of the primary authentication is shown in FIG. 6.1.2-1, TS 33.501 v.15.2.0. A revised version of which is shown in FIG. 10.

The SEAF may initiate an authentication with the UE during any procedure establishing a signalling connection with the UE, according to the SEAF's policy. The UE shall use subscriber concealed identifier (SUCI) or 5G-GUTI in the Registration Request. In case the UE requests an application layer authentication, it includes an indication (AKMA_UE_Ind) in the request message.

Embodiments related to the N1 message:

A new Registration Request type

A new service request type

An existing NAS message including a new indication for AKMA authentication

Embodiments Related to Identifier:

The message carrying the indication could optionally carry an AKMA temporary identifier that was allocated to the UE upon a previous run of AKMA authentication.

Realization of Support Negotiation:

The UE may indicate its support of AKMA authentication in the UE (security) capability. The network (visited) may indicate its support of AKMA authentication via the ABBA parameter. In such a case negotiation of AKMA authentication usage could be realized during primary authentication and NAS security establishment. Network gets the information of support in UE caps and UE gets the information of network support (and hence confirmation) in ABBA parameter The UE may just assume that the network supports AKMA and includes the indication, if the procedure fails the UE falls back to legacy procedures (trials and error).

The SEAF shall invoke the Nausf_UEAuthentication service by sending a Nausf_UEAuthentication_Authenticate Request message to the AUSF whenever the SEAF wishes to initiate an authentication.

The Nausf_UEAuthentication_Authenticate Request message shall contain either:

SUCI, as defined in TS 33.501 v.15.2.0, or

SUPI, as defined in TS 23.501.

The SEAF shall include the SUPI in the Nausf_UEAuthentication_Authenticate Request message in case the SEAF has a valid 5G-GUTI and re-authenticates the UE. Otherwise the SUCI is included in Nausf_UEAuthentication_Authenticate Request. SUPI/SUCI structure is part of stage 3 protocol design.

The Nausf_UEAuthentication_Authenticate Request shall furthermore contain:

the serving network name, as defined in sub-clause 6.1.1.4 of TS 33.501 v.15.2.0, an indication (AKMA_UE_Ind) in case the authentication is for application layer purpose.

NOTE 2: The local policy for the selection of the authentication method does not need to be on a per-UE basis, but can be the same for all UEs.

Upon receiving the Nausf_UEAuthentication_Authenticate Request message, the AUSF shall check that the requesting SEAF in the serving network is entitled to use the serving network name in the Nausf_UEAuthentication_Authenticate Request by comparing the serving network name with the expected serving network name. The AUSF shall store the received serving network name temporarily. If the serving network is not authorized to use the serving network name, the AUSF shall respond with "serving network not authorized" in the Nausf_UEAuthentication_Authenticate Response.

The Nudm_UEAuthentication_Get_Request sent from AUSF to UDM includes the following information:

SUCI or SUPI;

the serving network name;

an indication that the authentication is for application layer in case the authentication is for application layer purpose. This may be an indication (AKMA_UE_Ind) received from the UE, or another indication since the AUSF could also get the request to run application layer authentication from some network node, such as BS, AKMA anchor or some other node.

Upon reception of the Nudm_UEAuthentication_Get_Request, the UDM shall invoke subscriber identifier de-concealing function (SIDF) if a SUCI is received. SIDF shall de-conceal SUCI to gain SUPI before UDM can process the request.

Based on SUPI, the UDM/ARPF shall choose the authentication method, based on the subscription data.

NOTE 3: The Nudm_UEAuthentication_Get Response in reply to the Nudm_UEAuthentication_Get_Request and the Nausf_UEAuthentication_Authenticate Response message in reply to the Nausf_UEAuthentication_Authenticate Request message are described as part of the authentication procedures in clause 6.1.3 of TS 33.501 v.15.2.0.

Consider first embodiments as applicable for extendable authentication protocol (EAP)-AKA'.

EAP-AKA' is specified in RFC 5448. The 3GPP 5G profile for EAP-AKA' is specified in the normative Annex F of TS 33.501 v.15.2.0.

The selection of using EAP-AKA' is described in sub-clause 6.1.2 of TS 33.501 v.15.2.0.

Figure 11:
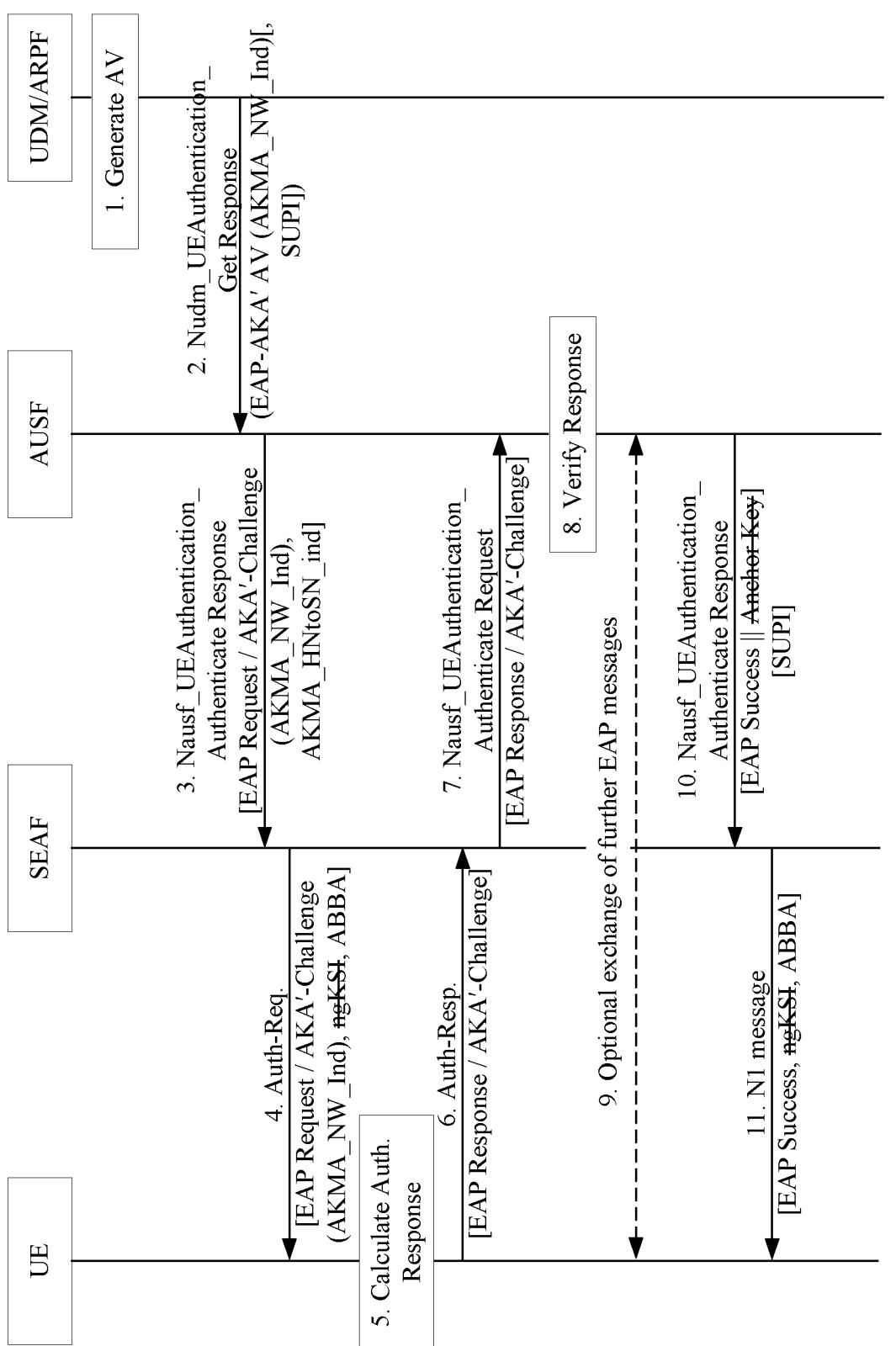
FIG. 11 is a signalling diagram of a revised version of authentication procedure for EAP-AKA' according to some embodiments.

The authentication procedure for EAP-AKA' works as follows, cf. also FIG. 6.1.3.1-1 of TS 33.501 v.15.2.0, a revised version of which is shown in FIG. 11:

1. The UDM/ARPF shall first generate an authentication vector (AV) with Authentication Management Field (AMF) separation bit=1 as defined in TS 33.102. If the request from the AUSF indicated that authentication is for application layer purpose, the UDM/ARPF includes AKMA_NW_Ind (e.g., in one embodiment, sets the AMF bit in position x to value=1). This acts as an indication to the UE of the type of authentication. The UDM/ARPF shall then compute CK' and IK' as per the normative Annex A of TS 33.501 v.15.2.0 and replace CK and IK by CK' and IK'.

2. The UDM shall subsequently send this transformed authentication vector AV' (RAND, AUTN, XRES, CK', IK') to the AUSF from which it received the Nudm_UEAuthentication_Get_Request together with an indication that the AV' is to be used for EAP-AKA' using a Nudm_UEAuthentication_Get Response message.

NOTE: The exchange of a Nudm_UEAuthentication_Get_Request message and an Nudm_UEAuthentication_Get Response message between the AUSF and the UDM/ARPF described in the preceding paragraph is the same as for trusted access using EAP-AKA' described in TS 33.402, sub-clause 6.2, step 10, except for the input parameter to the key derivation, which is the value of <network name>. The "network name" is a concept from RFC 5448; it is carried in the AT_KDF_INPUT attribute in EAP-AKA'. The value of <network name> parameter is not defined in RFC 5448, but rather in 3GPP specifications. For EPS, it is defined as "access network identity" in TS 24.302, and for 5G, it is defined as "serving network name" in sub-clause 6.1.1.4 of TS 33.501 v.15.2.0.

In case SUCI was included in the Nudm_UEAuthentication_Get_Request, UDM will include the SUPI in the Nudm_UEAuthentication_Get Response.

The AUSF and the UE shall then proceed as described in RFC 5448 until the AUSF is ready to send the EAP-Success.

3. The AUSF shall send the EAP-Request/AKA'-Challenge message to the SEAF in a Nausf_UEAuthentication_Authenticate Response message. The SEAF shall set the ABBA paremeter as defined in Annex A.7.1 of TS 33.501 v.15.2.0. In case the authentication is for application layer purpose, the EAP-Request/AKA'-Challenge message carries the AKMA_NW_Ind (e.g., AMF bit position x=1). In addition, the AUSF includes an indication to the SEAF (AKMA_HNtoSN_Ind) that the authentication is for application layer purpose (AKMA_Ind). This indication is different from the indication to the UE since the SEAF will not interpret the content of the EAP-AKA' messages.

4. The SEAF shall transparently forward the EAP-Request/AKA'-Challenge message to the UE in a NAS message Authentication Request message including AKMA_NW_Ind (e.g., AMF bit position x=1). The ME shall forward the random number (RAND) and authentication token (AUTN) received in EAP-Request/AKA'-Challenge message to the USIM. This message shall include the ngKSI and ABBA parameter. In fact, SEAF shall include the ngKSI and ABBA parameter in all EAP-Authentication request message. ngKSI will be used by the UE and AMF to identify the partial native security context that is created if the authentication is successful. In case authentication is for application layer purpose, ngKSI is not included.

NOTE 1: The SEAF needs to understand that the authentication method used is an EAP method by evaluating the type of authentication method based on the Nausf_UEAu-thentication_Authenticate Response message.

5. At receipt of the RAND and AUTN, the USIM shall verify the freshness of the AV' by checking whether AUTN can be accepted as described in TS 33.102. If so, the USIM computes a response RES. The USIM shall return RES, CK, IK to the ME. If the USIM computes a Kc (i.e. GPRS Kc) from CK and IK using conversion function c3 as described in TS 33.102, and sends it to the ME, then the ME shall ignore such GPRS Kc and not store the GPRS Kc on USIM or in ME. The ME shall derive CK' and IK' according to Annex A.3 of TS 33.501 v.15.2.0.

If the verification of the AUTN fails on the USIM, then the USIM and ME shall proceed as described in sub-clause 6.1.3.3 of TS 33.501 v.15.2.0.

The ME checks the new AMF_NW_Ind (e.g., AMF bit position x=1) and if it indicates that authentication is for application layer purpose, the ME knows that there is no need to derive $K_{SEAF}$ key for the serving network, i.e. only a key in the AUSF level needs to be generated.

6. The UE shall send the EAP-Response/AKA'-Challenge message to the SEAF in a NAS message Auth-Resp message.

7. The SEAF shall transparently forwards the EAP-Response/AKA'-Challenge message to the AUSF in Nausf_UEAuthentication_Authenticate Request message.

8. The AUSF shall verify the message, and if the AUSF has successfully verified this message it shall continue as follows, otherwise it shall return an error.

9. The AUSF and the UE may exchange EAP-Request/AKA'-Notification and EAP-Response/AKA'-Notification messages via the SEAF. The SEAF shall transparently forward these messages.

NOTE 2: EAP Notifications as described in RFC 3748 and EAP-AKA Notifications as described in RFC 4187 can be used at any time in the EAP-AKA exchange. These notifications can be used e.g. for protected result indications or when the EAP server detects an error in the received EAP-AKA response.

10. The AUSF derives EMSK from CK' and IK' as described in RFC 5448 and Annex F of TS 33.501 v.15.2.0. The AUSF uses the first 256 bits of EMSK as the $K_{AUSF}$ and then calculates $K_{SEAF}$ from $K_{AUSF}$ as described in clause A.6. In case the authentication is for application layer purpose, the AUSF obtains $K_{AUSF}$ or similar key from the EMSK, and the AUSF does not derive $K_{SEAF}$. The AUSF shall send an EAP Success message to the SEAF inside Nausf_UEAuthentication_Authenticate Response, which shall forward it transparently to the UE.

Nausf_UEAuthentication_Authenticate Response message contains the $K_{SEAF}$. In case the authentication is for application layer purpose, the Nausf_UEAuthentication_Authenticate Response message does not contain the $K_{SEAF}$. If the AUSF received a SUCI from the SEAF when the authentication was initiated (see sub-clause 6.1.2 of TS 33.501 v.15.2.0), then the AUSF shall also include the SUPI in the Nausf_UEAuthentication_Authenticate Response message.

NOTE 3: For lawful interception, the AUSF sending SUPI to SEAF is necessary but not sufficient. By including the SUPI as input parameter to the key derivation of $K_{AMF}$ from $K_{SEAF}$, additional assurance on the correctness of SUPI is achieved by the serving network from both, home network and UE side. See also step 11.

11. The SEAF shall send the EAP Success message to the UE in the N1 message. This message shall also include the ngKSI and the ABBA parameter. The SEAF shall set the ABBA paremeter as defined in Annex A.7.1 of TS 33.501 v.15.2.0. In case authentication is for application layer purpose, ngKSI is not included.

NOTE 4: Step 11 could be NAS Security Mode Command. In case authentication is for application layer purpose, this would likely be another message.

NOTE 5: The ABBA parameter is included to enable the bidding down protection of security features that may be introduced later.

The key received in the Nausf_UEAuthentication_Authenticate Response message shall become the anchor key, $K_{SEAF}$ in the sense of the key hierarchy in sub-clause 6.2 of TS 33.501 v.15.2.0. The SEAF shall then derive the $K_{AMF}$ from the $K_{SEAF}$, the ABBA parameter and the SUPI according to Annex A.7 of TS 33.501 v.15.2.0 and send it to the AMF. On receiving the EAP-Success message, the UE derives EMSK from CK' and IK' as described in RFC 5448 and Annex F of TS 33.501 v.15.2.0. The ME uses the first 256 bits of the EMSK as the $K_{AUSF}$ and then calculates $K_{SEAF}$ in the same way as the AUSF. The UE shall derive the $K_{AMF}$ from the $K_{SEAF}$, the ABBA parameter and the SUPI according to Annex A.7 of TS 33.501 v.15.2.0. In case authentication is for application layer purpose, only $K_{AUSF}$ is derived but no further keys.

The further steps taken by the AUSF upon receiving a successfully verified EAP-Response/AKA'-Challenge message are described in sub-clause 6.1.4 of TS 33.501 v.15.2.0 document. In case authentication is for application layer purposes, this step is not performed.

If the EAP-Response/AKA'-Challenge message is not successfully verified, the subsequent AUSF behaviour is determined according to the home network's policy. If the AUSF and SEAF determines that the authentication was successful, then the SEAF provides the ngKSI and the $K_{AMF}$ to the AMF. In case authentication is for application layer purpose, this step is not performed.

Consider now other embodiments as applicable for 5G AKA. 5G AKA enhances EPS AKA by providing the home network with proof of successful authentication of the UE from the visited network. The proof is sent by the visited network in an Authentication Confirmation message.

The selection of using 5G AKA is described in sub-clause 6.1.2 of TS 33.501 v.15.2.0.

NOTE 1: 5G AKA does not support requesting multiple 5G AVs, neither the SEAF pre-fetching 5G AVs from the home network for future use.

The authentication procedure for 5G AKA works as follows, cf. also FIG. 6.1.3.2-1, a revised version of which is shown in FIG. 12:

1. For each Nudm_Authenticate_Get_Request, the UDM/ARPF shall create a 5G HE AV. The UDM/ARPF does this by generating an AV with the Authentication Management Field (AMF) separation bit set to "1" as defined in TS 33.102. The UDM/ARPF shall then derive $K_{AUSF}$ as per Annex A.2 of TS 33.501 v.15.2.0, and calculate XRES* as per Annex A.4 of TS 33.501 v.15.2.0. If the request from the AUSF indicated that authentication is for application layer purpose, the UDM/ARPF includes AKMA_NW_Ind (e.g., sets the AMF bit in position x to value=1). This acts as an indication to the UE of the type of authentication. Finally, the UDM/ARPF shall create a 5G HE AV from RAND, AUTN, XRES*, and $K_{AUSF}$.

2. The UDM shall then return the 5G HE AV to the AUSF together with an indication that the 5G HE AV is to be used for 5G-AKA in a Nudm_UEAuthentication_Get Response. In case SUCI was included in the Nudm_UEAuthentication- _Get_Request, UDM will include the SUPI in the Nudm_UEAuthentication_Get Response.

3. The AUSF shall store the XRES* temporarily together with the received SUCI or SUPI. The AUSF may store the $K_{AUSF}$.

4. The AUSF shall then generate the 5G AV from the 5G HE AV received from the UDM/ARPF by computing the HXRES* from XRES* according to Normative Annex A.5 of TS 33.501 v.15.2.0 and $K_{SEAF}$ from $K_{AUSF}$ according to Annex A.6 of TS 33.501 v.15.2.0, and replacing the XRES* with the HXRES* and $K_{AUSF}$ with $K_{SEAF}$ in the 5G HE AV. In case the authentication is for application layer purpose, the AUSF does not derive $K_{SEAF}$.

5. The AUSF shall then remove the $K_{SEAF}$ return the 5G SE AV (RAND, AUTN, HXRES*) to the SEAF in a Nausf_UEAuthentication_Authenticate Response. In case the authentication is for application layer purpose, the AUSF does not need to remove the $K_{SEAF}$ since it was not derived. Also, in case the authentication is for application layer purpose, the Nausf_UEAuthentication_Authenticate Response message carries the AKMA_NW_Ind (e.g., AMF bit position x=1). In addition, the AUSF includes an indication to the SEAF (AKMA_HNtoSN_Ind) that the authentication is for application layer purpose (AKMA_Ind). This indication is different from the indication to the UE since the SEAF will not interpret the AMF bit.

6. The SEAF shall send RAND, AUTN to the UE in a NAS message Authentication-Request including AKMA_NW_Ind (e.g., AMF bit position x=1. This message shall also include the ngKSI that will be used by the UE and AMF to identify the $K_{AMF}$ and the partial native security context that is created if the authentication is successful. In case authentication is for application layer purpose, ngKSI is not included. This message shall also include the ABBA parameter. The SEAF shall set the ABBA paremeter as defined in Annex A.7.1 of TS 33.501 v.15.2.0. The ME shall forward the RAND and AUTN received in NAS message Authentication Request to the USIM.

NOTE 2: The ABBA parameter is included to enable the bidding down protection of security features that may be introduced later.

7. At receipt of the RAND and AUTN, the USIM shall verify the freshness of the 5G AV by checking whether AUTN can be accepted as described in TS 33.102. If so, the USIM computes a response RES. The USIM shall return RES, CK, IK to the ME. If the USIM computes a Kc (i.e. GPRS Kc) from CK and IK using conversion function c3 as described in TS 33.102, and sends it to the ME, then the ME shall ignore such GPRS Kc and not store the GPRS Kc on USIM or in ME. The ME then shall compute RES* from RES according to Annex A.4 of TS 33.501 v.15.2.0. The ME shall calculate $K_{AUSF}$ from CK∥IK according to clause A.2 of TS 33.501 v.15.2.0. The ME shall calculate $K_{SEAF}$ from $K_{AUSF}$ according to clause A.6 of TS 33.501 v.15.2.0. In some embodiments, an ME accessing 5G shall check during authentication that the "separation bit" in the AMF field of AUTN is set to 1. The "separation bit" is bit 0 of the AMF field of AUTN. NOTE: This separation bit in the AMF field of AUTN can not be used anymore for operator specific purposes as described by TS 33.102, Annex F.

The ME checks the new AMF_NW_Ind (i.e. AMF bit position x=1) and if it indicates that authentication is for application layer purpose, the ME knows that there is no need to derive $K_{SEAF}$ key for the serving network, i.e. only a key in the AUSF level needs to be generated.

8. The UE shall return RES* to the SEAF in a NAS message Authentication Response.

9. The SEAF shall then compute HRES* from RES* according to Annex A.5 of TS 33.501 v.15.2.0, and the SEAF shall compare HRES* and HXRES*. If they coincide, the SEAF shall consider the authentication successful from the serving network point of view. If not, the SEAF proceed as described in sub-clause 6.1.3.2.1 of TS 33.501 v.15.2.0. If the UE is not reached, and the RES* is never received by the SEAF, the SEAF shall consider authentication as failed, and indicate a failure to the AUSF.

10. The SEAF shall send RES* together with the corresponding SUCI or SUPI, as received from the UE, in a Nausf_UEAuthentication_Authenticate Request message to the AUSF.

11. When the AUSF receives the Nausf_UEAuthentication_Authenticate Request message including a RES* it may verify whether the AV has expired. If the AV has expired the AUSF may consider the authentication as unsuccessful from the home network point of view. AUSF shall compare the received RES* with the stored XRES*. If the RES* and XRES* are equal, the AUSF shall consider the authentication as successful from the home network point of view.

12. The AUSF shall indicate to the SEAF in the Nausf_UEAuthentication_Authenticate Response whether authentication was successful or not from the home network point of view. If the authentication was successful, the $K_{SAEF}$ shall be sent to the SEAF in the Nausf_UEAuthentication_Authenticate Response. In case the authentication is for application layer purpose, the $K_{SAEF}$ is not included. In case the AUSF received a SUCI from the SEAF when the authentication was initiated (see sub-clause 6.1.2 of TS 33.501 v.15.2.0), and if the authentication was successful, then the AUSF shall also include the SUPI in Nausf_UEAuthentication_Authenticate Response.

If the authentication was successful, the key $K_{SEAF}$ received in the Nausf_UEAuthentication_Authenticate Response message shall become the anchor key in the sense of the key hierarchy in sub-clause 6.2 of the TS 33.501 v.15.2.0. Then the SEAF shall derive the $K_{AMF}$ from the $K_{SEAF}$, the ABBA parameter and the SUPI according to Annex A.7 of TS 33.501 v.15.2.0, and shall provide the ngKSI and the $K_{AMF}$ to the AMF. In case authentication is for application layer purpose, this step is not performed.

If a SUCI was used for this authentication, then the SEAF shall only provide ngKSI and $K_{AMF}$ to the AMF after it receives the Nausf_UEAuthentication_Authenticate Response message containing SUPI; no communication services will be provided to the UE until the SUPI is known to the serving network. In case authentication is for application layer purpose, this step is not performed.

The further steps taken by the AUSF after the authentication procedure are described in sub-clause 6.1.4 of TS 33.501 v.15.2.0. In case authentication is for application layer purposes, this step is not performed.

Consider now other embodiments as applicable to EAP TLS. EAP-TLS is a mutual authentication EAP method that can be used by the EAP peer and the EAP server to authenticate each other. It is specified in RFC 5216. The 3GPP transport layer security (TLS) protocol profile related to supported TLS versions and supported TLS cipher suites in 3GPP networks is specified in TS 33.310, and should be followed when EAP-TLS is used in 3GPP networks.

EAP-TLS supports several TLS versions, and the negotiation of the TLS version is part of EAP-TLS. The main principle of negotiation goes as follows. The EAP server indicates the support for EAP-TLS in the EAP-Request. If the peer chooses EAP-TLS, it responds with an EAP- Response indicating in the ClientHello message which TLS versions the peer supports. The EAP server chooses the TLS version, and indicates the chosen version in the ServerHello message.

The TLS procedure described in the RFC 5216 is TLS 1.1. However, the use of TLS 1.1 is not recommended in 3GPP networks, and should be disabled also in the EAP server if EAP-TLS is used. A newer version, TLS 1.2 is defined in RFC 5246. The basic protocol procedures for TLS 1.1 and TLS 1.2 are the same. The major changes are in security capability, pseudorandom function (PRF) and cipher suites. The details of changes can be found in section 1.2 of RFC 5246. The EAP server should always choose the highest TLS version that is supported on both endpoints. The procedure below is based on the unified authentication framework from TS 33.501 v.15.2.0, procedures from TS 23.502 and RFC 5216. The procedure is presented here as an example, and other potential procedures are possible, e.g. if TLS resumption is used.

As shown in FIG. 13:

1. The UE sends the Registration Request message to the SEAF, containing SUCI. If the SUPI is in NAI format, only the username part of the NAI is encrypted using the selected protection scheme and included in the SUCI, together with the realm part in the NAI needed for UDM routing. In case the UE requests an application layer authentication, it includes an indication (AKMA_UE_Ind) in the request message.

Privacy considerations are described in Clause B.2.2 of TS 33.501 v.15.2.0.

2. The SEAF sends Nausf_UEAuthentication_Authenticate Request message to the AUSF. The SUCI and the serving network name (as described in clause 6.1.1.4 of TS 33.501 v.15.2.0) are included in the message. In case the UE requests an application layer authentication, it includes an indication (AKMA_UE_Ind) in the request message.

3. AUSF sends the Nudm_UEAuthentication_Get_Request, containing SUCI and the serving network name, to UDM. The general rules for UDM selection apply. In case the authentication is for application layer purpose the message also contains an indication of that. This may be an indication (AKMA_UE_Ind) received from the UE, or another indication (AKMA_Ind) since the AUSF could also get the request to run application layer authentication from some network node, such as BSF, AKMA anchor or some other node 4. The SIDF located within the UDM de-conceals the SUCI to SUPI if SUCI is received in the message. The UDM then selects the primary authentication method.

5. If the UDM chooses to use EAP-TLS, it sends the SUPI and an indicator to choose EAP-TLS to AUSF in the Nudm_UEAuthentication_Get Response. If the request from the AUSF indicated that authentication is for application layer purpose, the UDM/ARPF may include AKMA_N-W_Ind. This acts as an indication to the UE of the type of authentication.

6. With the received SUPI and the indicator, the AUSF chooses EAP-TLS as the authentication method. The AUSF sends the Nausf_UEAuthentication_Authenticate Response message containing EAP-Request/EAP-TLS [TLS start] message to the SEAF.

7. The SEAF forwards the EAP-Request/EAP-TLS [TLS start] in the Authentication Request message to the UE. This message also includes the ngKSI and the ABBA parameter. In fact, the SEAF shall always include the ngKSI and ABBA parameter in all EAP-Authentication request message. ngKSI will be used by the UE and AMF to identify the partial native security context that is created if the authentication is successful. The SEAF shall set the ABBA paremeter as defined in Annex A.7.1 of TS 33.501 v.15.2.0.

8. After receiving the EAP-TLS [TLS-start] message from SEAF, the UE replies with an EAP-Response/EAP-TLS [client_hello] to the SEAF in the Authentication Response message. The contents of TLS client_hello are defined in the TLS specification of the TLS version in use.

NOTE1: The EAP framework supports negotiation of EAP methods. If the UE does not support EAP-TLS, it should follow the rule described in RFC 3748 to negotiate another EAP method. In 5G system, UDM typically knows which EAP method and credentials are supported by the subscriber, and consequently EAP based negotiation may never be used.

9. The SEAF forwards the EAP-Response/EAP-TLS [client hello] message to AUSF in the Nausf_UEAuthentication_Authenticate Request.

10. The AUSF replies to the SEAF with EAP-Request/EAP-TLS in the Nausf_UEAuthentication_Authenticate Response, which further includes information elements such as server_hello, server certificate, server_key_exchange, certificate_request, server_hello_done. These information elements are defined in the RFCs for the corresponding TLS version in use. In case the authentication is for application layer purpose, the EAP-Request/EAP-TLS message carries the AKMA_NW_Ind received from the UDM. If no AKMA_NW_Ind was received from the UDM, the AUSF generates the AKMA_NW_Ind itself in (i.e. a new EAP attribute). In addition, the AUSF includes an indication to the SEAF (AKMA_HNtoSN_Ind) that the authentication is for application layer purpose. This indication is different from the indication to the UE since the SEAF will not interpret the content of the EAP-TLS messages.

In another embodiment, it would also be possible to send the AKMA_NW_Ind and AKMA_HNtoSN_Ind in steps 6 and 7 above instead in steps 10 and 11.

11. The SEAF forwards the EAP-Request/EAP-TLS message with server_hello and other information elements to the UE through Authentication Request message including AKMA_NW_Ind. This message also includes the ngKSI and the ABBA parameter. The SEAF shall set the ABBA paremeter as defined in Annex A.7.1 of TS 33.501 v.15.2.0. In case authentication is for application layer purpose, ngKSI is not included.

12. The UE authenticates the server with the received message from step 11. The UE checks the presence of the AMF_NW_Ind (i.e. a new EAP attribute) and if it indicates that authentication is for application layer purpose, the UE knows that there is no need to derive $K_{SEAF}$ key for the serving network, i.e. only a key in the AUSF level needs to be generated.

NOTE 2: The UE is required to be pre-configured with a UE certificate and also certificates that can be used to verify server certificates.

13. If the TLS server authentication is successful, then the UE replies with EAP-Response/EAP-TLS in Authentication Response message, which further contains information element such as client_certificate, client_key_exchange, client_certificate_verify, change_cipher_spec, client finished etc. Privacy considerations are described in Clause B.2.1.2 of TS 33.501 v.15.2.0.

14. The SEAF forwards the message with EAP-Response/EAP-TLS message with client_certificate and other information elements to the AUSF in the Nausf_UEAuthentication_Authenticate Request.

15. The AUSF authenticates the UE based on the message received. The AUSF verifies that the client certificate provided by the UE belongs to the subscriber identified by the SUPI. If there is a miss-match in the subscriber identifiers in the SUPI, the AUSF does not accept the client certificate. If the AUSF has successfully verified this message, the AUSF continues to step 16, otherwise it returns an EAP-failure.

NOTE 2: The AUSF is required to be pre-configured with the root or any intermediary CA certificates that can be used to verify UE certificates. Deployment of certificate revocation lists (CRLs) and online certificate status protocol (OCSP) are described in clause B.2.2 of TS 33.501 v.15.2.0.

16. The AUSF sends EAP-Request/EAP-TLS message with change_cipher_spec and server finished to the SEAF in the Nausf_UEAuthentication_Authenticate Response.

17. The SEAF forwards EAP-Request/EAP-TLS message from step 16 to the UE with Authentication Request message. This message also includes the ngKSI and the ABBA parameter. The SEAF shall set the ABBA paremeter as defined in Annex A.7.1 of TS 33.501 v.15.2.0. In case authentication is for application layer purpose, ngKSI is not included.

18. The UE sends an empty EAP-TLS message to the SEAF in Authentication Response message.

19. The SEAF further forwards the EAP-Response/EAP-TLS message to the AUSF in the Nausf_UEAuthentication_Authenticate Request.

20. The AUSF uses the first 256 bits of EMSK as the $K_{AUSF}$ and then calculates $K_{SEAF}$ from $K_{AUSF}$ as described in Annex A.6. In case the authentication is for application layer purpose, the AUSF obtains $K_{AUSF}$ or similar key from the EMSK, and the AUSF does not derive $K_{SEAF}$. The AUSF sends an EAP-Success message to the SEAF together with the SUPI and the derived anchor key in the Nausf_UEAuthentication_Authenticate Response. In case the authentication is for application layer purpose, the Nausf_UEAuthentication_Authenticate Response message does not contain the anchor key $K_{SEAF}$.

21. The SEAF forwards the EAP-Success message to the UE and the authentication procedure is finished. This message also includes the ngKSI and the ABBA parameter. In case authentication is for application layer purpose, ngKSI is not included. The SEAF shall set the ABBA paremeter as defined in Annex A.7.1 of TS 33.501 v.15.2.0. Then the SEAF derives the $K_{AMF}$ from the $K_{SEAF}$, the ABBA parameter and the SUPI according to Annex A.7 of TS 33.501 v.15.2.0, and provides the ngKSI and the $K_{AMF}$ to the AMF. In case authentication is for application layer purpose, the SEAF does no derive $K_{AMF}$ c and neither ngKSI nor $K_{AMF}$ to the AMF is sent to the AMF.

On receiving the EAP-Success message, the UE derives EMSK and uses the first 256 bits of the EMSK as the $K_{AUSF}$ and then calculates $K_{SEAF}$ in the same way as the AUSF. The UE derives the $K_{AMF}$ from the $K_{SEAF}$, the ABBA parameter and the SUPI according to Annex A.7 of TS 33.501 v.15.2.0. In case authentication is for application layer purpose, only $K_{AUSF}$ is derived but no further keys.

NOTE 3: Step 21 could be NAS Security Mode Command.

NOTE 4: The ABBA parameter is included to enable the bidding down protection of security features that may be introduced later.

Although the subject matter described herein may be implemented in any appropriate type of system using any suitable components, the embodiments disclosed herein are described in relation to a wireless network, such as the example wireless network illustrated in FIG. 14. For sim-plicity, the wireless network of FIG. 14 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards. Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network equipment refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network equipment include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. Network equipment may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network equipment include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network equipment (e.g., MSCs, MMEs), O&M nodes, OSS nodes, SON nodes, positioning nodes (e.g., E-SMLCs), and/or MDTs. As another example, network equipment may implement a virtual network node as described in more detail below. More generally, however, network equipment may represent any suitable device (or group of devices) capable, configured, arranged, and/or operable to enable and/or provide a wireless device with access to the wireless network or to provide some service to a wireless device that has accessed the wireless network. In the below description, the term network node is used interchangeably with network equipment.

In FIG. 14, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port. Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 14 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa. In FIG. 15, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately. RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 15, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802. QQ2, CDMA, WCDMA, GSM, LTE, UTRAN, WiMax, or the like. Each transceiver may include transmitter QQ233 and/ or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

FIG. 16 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 16, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE). Still in the context of NFV, Virtual Network Function (VNF) is responsible for handling specific network functions that run in one or more virtual machines QQ340 on top of hardware networking infrastructure QQ330 and corresponds to application QQ320 in FIG. 16.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

FIG. 17 illustrates a telecommunication network connected via an intermediate network to a host computer in accordance with some embodiments. In particular, with reference to FIG. 17, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 17 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 18. FIG. 18 illustrates host computer communicating via a base station with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 18) served by base station QQ520.

Communication interface QQ526 may be configured to facilitate connection QQ560 to host computer QQ510. Connection QQ560 may be direct or it may pass through a core network (not shown in FIG. 18) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 18 may be similar or identical to host computer QQ430, one of base stations QQ412*a*, QQ412*b*, QQ412*c* and one of UEs QQ491, QQ492 of FIG. 17, respectively. This is to say, the inner workings of these entities may be as shown in FIG. 18 and independently, the surrounding network topology may be that of FIG. 17.

In FIG. 18, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve key agreement for application layer security, e.g., by leveraging the primary authentication mechanism via the serving network control plane while preserving the serving network key hierarchy. The teachings may therefore provide such benefits as control signaling efficiency, resource conservation, and improved security.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The following are certain enumerated embodiments further illustrating various aspects the disclosed subject matter.

Group A Embodiments

A1. A method performed by a communications device, the method comprising: receiving, via a control plane of a serving network of the communications device, a message in an authentication procedure for authentication of the communications device with a home network of the communications device, wherein the message indicates that the authentication is for the purpose of establishing a shared security key between the communications device and an application server.

A2. The method of embodiment A1, wherein the message is an authentication request message that requests the communications device to authenticate itself with the home network.

A3. The method of any of embodiments A1-A2, further comprising: determining, from the message, whether authentication with the home network is to be for the purpose of primary authentication or for the purpose of establishing a shared security key between the communications device and an application server; generating a master key shared between the communications device and the home network; and deriving, from the master key, a serving network security key shared between the communications device and the serving network or an application layer security key shared between the communications device and the application server, depending respectively on whether the authentication is determined to be for the purpose of primary authentication or for the purpose of establishing a shared security key between the communications device and an application server.

A4. The method of any of embodiments A1-A3, wherein the received message is a non-access stratum, NAS, authentication request message.

A5. The method of any of embodiments A1-A3, wherein the received message is an extensible authentication protocol, EAP, request message or an authentication and key agreement, AKA, challenge message.

A6. The method of any of embodiments A1-A5, further comprising transmitting, to the serving network, a message that indicates the authentication is to be for the purpose of establishing a shared security key between the communications device and an application server.

A6A. The method of embodiment A6, wherein the message transmitted to the serving network is a request message that requests registration with or service from the serving network.

A6B. The method of any of embodiments A6-A6A, wherein the message is transmitted to the serving network via a control plane of the serving network.

A7. The method of any of embodiments A1-A6, further comprising, after the communications device authenticates itself to the home network, and based on the purpose of the authentication being for establishing a shared security key between the communications device and an application server, generating a master key shared between the communications device and the home network and deriving, from the master key, an application layer security key shared between the communications device and the application server.

A8. The method of embodiment A7, further comprising securing communication between the communications device and the application server based on the application layer security key.

A9. The method of embodiment A8, wherein the communication between the communications device and the application server is performed over a user plane.

A10. The method of embodiment A8, wherein the communication between the communications device and the application server is performed over a control plane.

A11. The method of any of embodiments A7-A10, further comprising transmitting an application layer message to, and/or receiving an application layer message from, the application server, wherein the transmitted application layer message and/or the received application layer message is protected based on the application layer security key.

A12. The method of any of embodiments A1-A11, further comprising, after the communications device authenticates itself to the home network, and based on the purpose of the authentication being for establishing a shared security key between the communications device and an application server, generating a master key shared between the communications device and the home network, but refraining from deriving any serving network security key shared between the communications device and the serving network based on the master key.

A13. The method of any of embodiments A7-A12, wherein the master key comprises a key Kausf that is shared between the communications device and an authentication server function, AUSF.

A14. The method of any of embodiments A7-A12, wherein the master key comprises a key Kbsf that is shared between the communications device and a bootstrapping server function, BSF.

A15. The method of any of embodiments A1-A14, further comprising authenticating the communications device to the home network using the authentication procedure.

A16. The method of embodiment A15, wherein said authenticating comprises authenticating the communications device to the home network via a control plane of the serving network.

A17. The method of any of embodiments A1-A16, wherein the communications device is a wireless communications device.

A18. The method of any of embodiments A1-A16, wherein the communications device is a wireline communications device.

A19. A method performed by a communications device, the method comprising: transmitting, to a serving network of the communications device, a message that indicates authentication of the communications device with a home network of the communications device is to be for the purpose of establishing a shared security key between the communications device and an application server.

A20. The method of embodiment A19, further comprising, after the communications device authenticates itself to the home network, and based on the purpose of the authentication being for establishing a shared security key between the communications device and an application server, generating a master key shared between the communications device and the home network and deriving, from the master key, an application layer security key shared between the communications device and the application server.

A21. The method of embodiment A20, further comprising securing communication between the communications device and the application server based on the application layer security key.

A22. The method of embodiment A21, wherein the communication between the communications device and the application server is performed over a user plane.

A23. The method of embodiment A21, wherein the communication between the communications device and the application server is performed over a control plane.

A24. The method of any of embodiments A20-A23, further comprising transmitting an application layer message to, and/or receiving an application layer message from, the application server, wherein the transmitted application layer message and/or the received application layer message is protected based on the application layer security key.

A25. The method of any of embodiments A19-A24, further comprising, after the communications device authenticates itself to the home network, and based on the purpose of the authentication being for establishing a shared security key between the communications device and an application server, generating a master key shared between the communications device and the home network, but refraining from deriving any serving network security key shared between the communications device and the serving network based on the master key.

A26. The method of any of embodiments A20-A25, wherein the master key comprises a key Kausf that is shared between the communications device and an authentication server function, AUSF.

A27. The method of any of embodiments A20-A25, wherein the master key comprises a key Kbsf that is shared between the communications device and a bootstrapping server function, BSF.

A28. The method of any of embodiments A19-A27, further comprising authenticating the communications device to the home network.

A29. The method of embodiment A28, wherein said authenticating comprises authenticating the communications device to the home network via a control plane of the serving network.

A30. The method of any of embodiments A19-A29, wherein the communications device is a wireless communications device.

A31. The method of any of embodiments A19-A29, wherein the communications device is a wireline communications device.

A32. The method of any of embodiments A19-A31, wherein the message transmitted to the serving network is a request message that requests registration with or service from the serving network.

A33. The method of any embodiments A19-A32, wherein the message is transmitted to the serving network via a control plane of the serving network.

Group B Embodiments

B1. A method performed by network equipment configured for use in a home network of a communications device, the method comprising:

transmitting, via a control plane of a serving network of the communications device, a message in an authentication procedure for authentication of the communications device with the home network, wherein the message indicates the authentication is for the purpose of establishing a shared security key between the communications device and an application server.

B2. The method of embodiment B1, wherein the message is an authentication request message that requests the communications device to authenticate itself with the home network.

B3. The method of any of embodiments B1-B2, wherein the message is an extensible authentication protocol, EAP, request message or an authentication and key agreement, AKA, challenge message.

B4. The method of any of embodiments B1-B3, further comprising: receiving, from the communications device or other network equipment, a message that indicates the authentication of the communications device with the home network is to be for the purpose of establishing a shared security key between the communications device and an application server; and based on the message received from the communications device or the other network equipment, generating the message to be transmitted to indicate that the authentication is for the purpose of establishing a shared security key between the communications device and an application server.

B5. The method of any of embodiments B1-B4, further comprising: determining whether authentication of the communications device with the home network is to be for the purpose of primary authentication or for the purpose of establishing a shared security key between the communications device and an application server; generating a master key shared between the communications device and the home network; and deriving, from the master key, a serving network security key shared between the communications device and the serving network or refraining from deriving the serving network security key, depending respectively on whether the authentication is determined to be for the purpose of primary authentication or for the purpose of establishing a shared security key between the communications device and an application server.

B6. The method of any of embodiments B1-B5, further comprising, based on the purpose of the authentication being for establishing a shared security key between the communications device and an application server, generating a master key shared between the communications device and the home network, but refraining from deriving any serving network security key shared between the communications device and the serving network based on the master key.

B7. The method of any of embodiments B5-B6, wherein the master key comprises a key Kausf that is shared between the communications device and an authentication server function, AUSF.

B8. The method of any of embodiments B5-B6, wherein the master key comprises a key Kbsf that is shared between the communications device and a bootstrapping server function, BSF.

B9. The method of any of embodiments B1-B8, wherein the network equipment implements an authentication server function, AUSF.

B10. The method of any of embodiments B1-B8, wherein the network equipment implements a bootstrapping server function, BSF.

B11. The method of any of embodiments B1-B8, wherein the network equipment implements an authentication and key management for applications, AKMA, anchor.

B12. The method of any of embodiments B1-B11, further comprising, after transmitting the message, authenticating the communications device to the home network.

B13. The method of embodiment B12, wherein said authenticating comprises authenticating the communications device to the home network via a control plane of the serving network.

B14. The method of any of embodiments B1-B13, wherein the communications device is a wireless communications device.

B15. The method of any of embodiments B1-B13, wherein the communications device is a wireline communications device.

B16. A method performed by network equipment configured for use in a home network of a communications device, the method comprising:

receiving, from a serving network of the communications device, a message in an authentication procedure for authentication of the communications device with the home network, wherein the message indicates the authentication is for the purpose of establishing a shared security key between the communications device and an application server.

B17. The method of embodiment B16, wherein the message is an authentication request message that requests the communications device to authenticate itself with the home network.

B18. The method of any of embodiments B16-B17, wherein the message is a Nausf_UEAuthentication_Authenticate Request message.

B19. The method of any of embodiments B16-B18, further comprising, based on the received message, transmitting an authentication get request message that requests information for the authentication and that indicates the authentication is for the purpose of establishing a shared security key between the communications device and an application server.

B20. The method of any of embodiments B16-B19, further comprising, based on the purpose of the authentication being for establishing a shared security key between the communications device and an application server, generating a master key shared between the communications device and the home network, but refraining from deriving any serving network security key shared between the communications device and the serving network based on the master key.

B21. The method of any of embodiments B16-B21, wherein the master key comprises a key Kausf that is shared between the communications device and an authentication server function, AUSF.

B22. The method of any of embodiments B16-B21, wherein the master key comprises a key Kbsf that is shared between the communications device and a bootstrapping server function, BSF.

B23. The method of any of embodiments B16-B22, wherein the network equipment implements an authentication server function, AUSF.

B24. The method of any of embodiments B16-B22, wherein the network equipment implements a bootstrapping server function, BSF.

B25. The method of any of embodiments B16-B22, wherein the network equipment implements an authentication and key management for applications, AKMA, anchor.

B26. The method of any of embodiments B16-B25, further comprising, after transmitting the message, authenticating the communications device to the home network.

B27. The method of embodiment B26, wherein said authenticating comprises authenticating the communications device to the home network via a control plane of the serving network.

B28. The method of any of embodiments B16-B27, wherein the communications device is a wireless communications device.

B29. The method of any of embodiments B16-B27, wherein the communications device is a wireline communications device.

Group X Embodiments

X1. A method performed by network equipment configured for use in a serving network of a communications device, the method comprising:

receiving, from network equipment in a home network of the communications device, a message in an authentication procedure for authentication of the communications device with the home network, wherein the message indicates the authentication is for the purpose of establishing a shared security key between the communications device and an application server.

X2. The method of embodiment X1, wherein the message is an authentication response message.

X3. The method of any of embodiments X1-X2, wherein the message is an Nausf_UEAuthentication_Authenticate Response message.

X4. The method of any of embodiments X1-X3, further comprising, based on authentication of the communications device with the home network being for the purpose of establishing a shared security key between the communications device and an application server, preserving an existing serving network security context for the communications device by refraining from deriving new serving network security keys for the communications device as a result of the authentication.

X5. The method of any of embodiments X1-X4, further comprising transmitting, to the communications device via a control plane of the serving network, a message in the authentication procedure, wherein the transmitted message indicates the authentication is for the purpose of establishing a shared security key between the communications device and an application server.

X6. The method of embodiment X5, wherein the transmitted message is an authentication request message that requests the communications device to authenticate itself with the home network.

X7. The method of any of embodiments X5-X6, wherein the transmitted message is a non-access stratum, NAS, authentication request message.

X8. The method of embodiment X7, wherein the NAS authentication request message includes an extensible authentication protocol, EAP, request message or an authentication and key agreement, AKA, challenge message.

X9. The method of any of embodiments X1-X9, wherein the network equipment implements a security anchor function, SEAF.

X10. The method of any of embodiments X1-X9, wherein the network equipment implements an access and mobility function, AMF.

X11. The method of any of embodiments X1-X9, wherein the network equipment implements a session management function, SMF.

X12. The method of any of embodiments X1-X11, wherein the communications device is a wireless communications device.

X13. The method of any of embodiments X1-X11, wherein the communications device is a wireline communications device.

X14. The method of any of embodiments X1-X13, further comprising:

receiving, from the communications device, a message that indicates authentication of the communications device with a home network of the communications device is to be for the purpose of establishing a shared security key between the communications device and an application server; and based on the message received from the communications device, transmitting a message to the home network that requests authentication of the communications device with the home network for the purpose of establishing a shared security key between the communications device and an application server.

X14A. The method of embodiment X14, wherein the received message is a request message that requests registration with or service from the serving network.

X15. A method performed by network equipment configured for use in a serving network of a communications device, the method comprising:

receiving, from the communications device, a message that indicates authentication of the communications device with a home network of the communications device is to be for the purpose of establishing a shared security key between the communications device and an application server.

X16. The method of embodiment X15, wherein the message is a request message that requests registration with or service from the serving network.

X17. The method of any embodiments X15-X16, wherein the message is received via a control plane of the serving network.

X18. The method of any of embodiments X15-X17, further comprising, based on authentication of the communications device with the home network being for the purpose of establishing a shared security key between the communications device and an application server, preserving an existing serving network security context for the communications device by refraining from deriving new serving network security keys for the communications device as a result of the authentication.

X19. The method of any of embodiments X15-X18, further comprising, based on the message received from the communications device, transmitting a message to the home network that requests authentication of the communications device with the home network for the purpose of establishing a shared security key between the communications device and an application server.

X20. The method of embodiment X19, wherein the transmitted message is a Nausf_UEAuthentication_Authenticate Request message.

X21. The method of any of embodiments X15-X20, further comprising transmitting, to the communications device via a control plane of the serving network, a message in the authentication procedure, wherein the transmitted message indicates the authentication is for the purpose of establishing a shared security key between the communications device and an application server.

X22. The method of embodiment X21, wherein the transmitted message is an authentication request message that requests the communications device to authenticate itself with the home network.

X23. The method of any of embodiments X21-X22, wherein the transmitted message is a non-access stratum, NAS, authentication request message.

X24. The method of embodiment X23, wherein the NAS authentication request message includes an extensible authentication protocol, EAP, request message or an authentication and key agreement, AKA, challenge message.

X25. The method of any of embodiments X15-X24, wherein the network equipment implements a security anchor function, SEAF.

X26. The method of any of embodiments X15-X24, wherein the network equipment implements an access and mobility function, AMF.

X27. The method of any of embodiments X15-X24, wherein the network equipment implements a session management function, SMF.

X28. The method of any of embodiments X15-X27, wherein the communications device is a wireless communications device.

X29. The method of any of embodiments X15-X27, wherein the communications device is a wireline communications device.

Group C Embodiments

C1. A communications device comprising:

processing circuitry and memory, the memory containing instructions executable by the processing circuitry whereby the communications device is configured to perform any of the steps of any of the Group A embodiments.

C2. A user equipment (UE) comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

C3. Network equipment configured for use in a home network of a communications device, the network equipment comprising:

processing circuitry and memory, the memory containing instructions executable by the processing circuitry whereby the network equipment is configured to perform any of the steps of any of the Group B embodiments.

C4. Network equipment configured for use in a serving network of a communications device, the network equipment comprising:

processing circuitry and memory, the memory containing instructions executable by the processing circuitry whereby the network equipment is configured to perform any of the steps of any of the Group X embodiments.

Group D Embodiments

D1. A communication system including a host computer comprising:

processing circuitry configured to provide user data; and a communication interface configured to forward the user data to a cellular network for transmission to a user equipment (UE), wherein the cellular network comprises network equipment having a communication interface and processing circuitry, the network equipment's processing circuitry configured to perform any of the steps of any of the Group B or Group X embodiments.

D2. The communication system of the pervious embodiment further including the network equipment.

D3. The communication system of the previous 2 embodiments, further including the UE, wherein the UE is configured to communicate with the network equipment.

D4. The communication system of the previous 3 embodiments, wherein:

the processing circuitry of the host computer is configured to execute a host application, thereby providing the user data; and the UE comprises processing circuitry configured to execute a client application associated with the host application.

D5. A method implemented in a communication system including a host computer, network equipment and a user equipment (UE), the method comprising:

at the host computer, providing user data; and at the host computer, initiating a transmission carrying the user data to the UE via a cellular network comprising the network equipment, wherein the network equipment performs any of the steps of any of the Group B or Group X embodiments.

D6. The method of the previous embodiment, further comprising, at the network equipment, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with network equipment, the UE comprising a radio interface and processing circuitry configured to perform any of the previous 3 embodiments.

D9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

D10. The communication system of the previous embodiment, wherein the cellular network further includes network equipment configured to communicate with the UE.

D11. The communication system of the previous 2 embodiments, wherein:

the processing circuitry of the host computer is configured to execute a host application, thereby providing the user data; and the UE's processing circuitry is configured to execute a client application associated with the host application.

D12. A method implemented in a communication system including a host computer, network equipment and a user equipment (UE), the method comprising:

at the host computer, providing user data; and at the host computer, initiating a transmission carrying the user data to the UE via a cellular network comprising the network equipment, wherein the UE performs any of the steps of any of the Group A embodiments.

D13. The method of the previous embodiment, further comprising at the UE, receiving the user data from the network equipment.

D14. A communication system including a host computer comprising:

communication interface configured to receive user data originating from a transmission from a user equipment (UE), wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including network equipment, wherein the network equipment comprises a communication interface configured to communicate with the UE.

D17. The communication system of the previous 3 embodiments, wherein:

the processing circuitry of the host computer is configured to execute a host application; and the UE's processing circuitry is configured to execute a client application associated with the host application, thereby providing the user data.

D18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, network equipment and a user equipment (UE), the method comprising:

at the host computer, receiving user data transmitted from the UE, wherein the UE performs any of the steps of any of the Group A embodiments.

D20. The method of the previous embodiment, further comprising:

at the UE, executing a client application, thereby providing the user data to be transmitted; and at the host computer, executing a host application associated with the client application.

D21. The method of the previous 2 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

D22. A communication system including a host computer comprising a communication interface configured to receive user data originating from a transmission from a user equipment (UE) via a cellular network that includes network equipment, wherein the network equipment comprises a communication interface and processing circuitry, the network equipment's processing circuitry configured to perform any of the steps of any of the Group B or Group X embodiments.

D23. The communication system of the previous embodiment further including the network equipment.

D24. The communication system of the previous 2 embodiments, further including the UE, wherein the UE is configured to communicate with the network equipment.

D25. The communication system of the previous 3 embodiments, wherein:

the processing circuitry of the host computer is configured to execute a host application;

the UE is configured to execute a client application associated with the host application, thereby providing the user data to be received by the host computer.

D26. A method implemented in a communication system including a host computer, network equipment and a user equipment (UE), the method comprising: at the host computer, receiving, user data originating from the UE, wherein the UE performs any of the steps of any of the Group A embodiments.

The invention claimed is:

1. A method performed by a communications device, the method comprising:

receiving, via a control plane of a serving network of the communications device, a message in an authentication procedure for authentication of the communications device with a home network of the communications device, wherein the message indicates that the authentication is for the purpose of establishing a shared security key between the communications device and an application server while preserving a security key hierarchy of the serving network by refraining from deriving new serving network security keys for the communication device as a result of the authentication;

determining, from the message, that authentication with the home network is to be for the purpose of establishing a shared security key between the communications device and an application server while preserving a security key hierarchy of the serving network;

generating a master key shared between the communications device and the home network; and based on said determining, deriving, from the master key, an application layer security key shared between the communications device and the application server, but preserving the security key hierarchy of the serving network by refraining from further deriving from the master key a serving network security key shared between the communications device and the serving network.

2. The method of claim 1, wherein the message is an authentication request message that requests the communications device to authenticate itself with the home network.

3. The method of claim 1, wherein the received message is a non-access stratum (NAS) authentication request message or an extensible authentication protocol (EAP) request message or an authentication and key agreement (AKA) challenge message.

4. The method of claim 1, further comprising transmitting, to the serving network, a message that indicates the authentication is to be for the purpose of establishing a shared security key between the communications device and an application server while preserving the security key hierarchy of the serving network.

5. The method of claim 1, wherein the message indicates that the authentication is for the purpose of establishing an application layer security key between the communications device and an application server for securing application layer communication between the communications device and the application server.

6. The method of claim 1, wherein the message indicates that the authentication is for Authentication and Key Management for Applications (AKMA) authentication, rather than primary authentication, wherein the AKMA authentication preserves the security key hierarchy of the serving network.

7. The method of claim 1, wherein authentication for the purpose of establishing a shared security key between the communications device and the application server preserves an existing anchor key in the security key hierarchy of the serving network even upon successful authentication of the communications device.

8. A method performed by a communications device, the method comprising:

transmitting, to a serving network of the communications device, a message that indicates authentication of the communications device with a home network of the communications device is to be for the purpose of establishing a shared security key between the communications device and an application server while preserving a security key hierarchy of the serving network by refraining from deriving new serving network security keys for the communication device as a result of the authentication; and after the communications device authenticates itself to the home network, and based on the purpose of the authentication being for establishing a shared security key between the communications device and an application server, generating a master key shared between the communications device and the home network and deriving, from the master key, an application layer security key shared between the communications device and the application server but preserving the security key hierarchy of the serving network by refraining from deriving from the master key a serving network security key shared between the communications device and the serving network.

9. The method of claim 8, further comprising securing communication between the communications device and the application server based on the application layer security key.

10. The method of claim 8, further comprising transmitting an application layer message to, and/or receiving an application layer message from, the application server, wherein the transmitted application layer message and/or the received application layer message is protected based on the application layer security key.

11. The method of claim 8, wherein:

the master key comprises a key Kausf that is shared between the communications device and an authentication server function (AUSF); or the master key comprises a key Kbsf that is shared between the communications device and a bootstrapping server function (BSF).

12. A method performed by network equipment configured for use in a home network of a communications device, the method comprising:

transmitting, via a control plane of a serving network of the communications device, a message in an authentication procedure for authentication of the communications device with the home network, wherein the message indicates the authentication is for the purpose of establishing a shared security key between the communications device and an application server while preserving a security key hierarchy of the serving network by refraining from deriving new serving network security keys for the communication device as a result of the authentication;

determining that authentication of the communications device with the home network is to be for the purpose of establishing a shared security key between the communications device and an application server while preserving a security key hierarchy of the serving network;

generating a master key shared between the communications device and the home network; and based on said determining, preserving the security key hierarchy of the serving network by refraining from deriving from the master key a serving network security key shared between the communications device and the serving network.

13. The method of claim 12, wherein the message is an authentication request message that requests the communications device to authenticate itself with the home network, or an extensible authentication protocol (EAP) request message, or an authentication and key agreement (AKA) challenge message.

14. The method of claim 12, further comprising:

receiving, from the communications device or other network equipment, a message that indicates the authentication of the communications device with the home network is to be for the purpose of establishing a shared security key between the communications device and an application server while preserving a security key hierarchy of the serving network; and based on the message received from the communications device or the other network equipment, generating the message to be transmitted to indicate that the authentication is for the purpose of establishing a shared security key between the communications device and an application server while preserving a security key hierarchy of the serving network.

15. The method of claim 12, wherein the master key comprises:

a key Kausf that is shared between the communications device and an authentication server function, AUSF; or a key Kbsf that is shared between the communications device and a bootstrapping server function (BSF).

16. The method of claim 12, wherein the network equipment implements an authentication server function (AUSF) or a bootstrapping server function (BSF) or an authentication and key management for applications (AKMA) anchor.

17. A method performed by network equipment configured for use in a home network of a communications device, the method comprising:

receiving, from a serving network of the communications device, a message in an authentication procedure for authentication of the communications device with the home network, wherein the message indicates the authentication is for the purpose of establishing a shared security key between the communications device and an application server while preserving a security key hierarchy of the serving network by refraining from deriving new serving network security keys for the communication device as a result of the authentication; and based on the purpose of the authentication being for establishing a shared security key between the communications device and an application server, generating a master key shared between the communications device and the home network, but refraining from deriving any serving network security key shared between the communications device and the serving network based on the master key.

18. The method of claim 17, wherein the message is an authentication request message that requests the communications device to authenticate itself with the home network.

19. The method of claim 17, further comprising, based on the received message, transmitting an authentication get request message that requests information for the authentication and that indicates the authentication is for the purpose of establishing a shared security key between the communications device and an application server while preserving a security key hierarchy of the serving network.

20. The method of claim 17, wherein:

the master key comprises a key Kausf that is shared between the communications device and an authentication server function, AUSF; or the master key comprises a key Kbsf that is shared between the communications device and a bootstrapping server function (BSF).

21. The method of claim 17, wherein the network equipment implements an authentication server function (AUSF) or a bootstrapping server function (BSF) or an authentication and key management for applications (AKMA) anchor.

* * * * *